United States Patent
Sharma

(10) Patent No.: US 11,968,159 B2
(45) Date of Patent: Apr. 23, 2024

(54) DEBATE SYSTEM AND METHOD

(71) Applicant: Yahoo Assets LLC, Dulles, VA (US)

(72) Inventor: Tanisha Sharma, Los Angeles, CA (US)

(73) Assignee: Yahoo Assets LLC, New York, NY (US)

( * ) Notice: Subject to any disclaimer, the term of this patent is extended or adjusted under 35 U.S.C. 154(b) by 73 days.

(21) Appl. No.: 17/717,187

(22) Filed: Apr. 11, 2022

(65) Prior Publication Data
US 2023/0328021 A1    Oct. 12, 2023

(51) Int. Cl.
*H04L 51/216*    (2022.01)
*H04L 51/046*    (2022.01)
*H04L 51/52*    (2022.01)

(52) U.S. Cl.
CPC .......... *H04L 51/216* (2022.05); *H04L 51/046* (2013.01); *H04L 51/52* (2022.05)

(58) Field of Classification Search
CPC ............................ H04L 51/216; H04L 51/046
See application file for complete search history.

(56) References Cited

U.S. PATENT DOCUMENTS

| | | | |
|---|---|---|---|
| 2008/0184122 A1* | 7/2008 | Grant | G06Q 10/10 715/723 |
| 2011/0185291 A1* | 7/2011 | Miller | G06Q 10/10 715/753 |
| 2013/0042186 A1* | 2/2013 | Tranchina | G06Q 10/10 715/753 |
| 2019/0306208 A1* | 10/2019 | Robinson | G06F 40/279 |
| 2021/0258536 A1* | 8/2021 | Mickeal | G06Q 50/01 |
| 2021/0345002 A1* | 11/2021 | Underwood | H04N 21/2187 |

\* cited by examiner

*Primary Examiner* — Caroline H Jahnige
(74) *Attorney, Agent, or Firm* — Cooper Legal Group LLC

(57) ABSTRACT

In an example, a starting argument post may be received, via a first debate interface, from a first client device associated with a first user account of a debate system. A first response post may be received, via a second debate interface, from a second client device associated with a second user account of the debate system. The first response post corresponds to a response to the starting argument post. The starting argument post and the first response post are included in a first debate thread. When a first submission status of the first user account is active, submission of a response post for inclusion in the first debate thread may be enabled via the first debate interface. A second response post may be received, via the first debate interface and when the first submission status of the first user account is active, from the first client device.

20 Claims, 18 Drawing Sheets

DEBATE SYSTEM AND METHOD

BACKGROUND

Social media services may allow users to create social media accounts for posting content, interacting with social media posts, discussing issues with each other, etc.

SUMMARY

Social media services may have an open environment where discussions can be impeded by multiple users who fuel antagonism between groups through likes, dislikes, comments, etc. Therefore, discussions on these services may become chaotic and disorganized due to lack of civil dialogue, wherein extreme views may become heightened and personal with echoing opinions supporting one another, thereby diminishing users' understanding of opposing perspectives.

In accordance with the present disclosure, one or more computing devices and/or methods are provided. In an example, a first debate interface may be displayed via a first client device associated with a first user account of a debate system. A starting argument post may be received, via the first debate interface, from the first client device. A second debate interface comprising a representation of the starting argument post may be displayed via a second client device associated with a second user account of the debate system. A first response post may be received, via the second debate interface, from the second client device. The first response post corresponds to a response to the starting argument post. The starting argument post and the first response post are included in a first debate thread corresponding to a debate between the first user account and the second user account. When a first submission status of the first user account is active, submission of a response post for inclusion in the first debate thread may be enabled via the first debate interface. The first submission status of the first user account is active after the first response post is received from the second client device. A second response post may be received, via the first debate interface and when the first submission status of the first user account is active, from the first client device. In response to receiving the second response post from the first client device, the second response post may be included in the first debate thread. When a second submission status of the second user account is active, submission of a response post for inclusion in the first debate thread may be enabled via the second debate interface. The second submission status of the second user account is active after the second response post is received from the first client device. A third response post may be received, via the second debate interface and when the second submission status of the second user account is active, from the second client device. In response to receiving the third response post from the first client device, the third response post may be included in the first debate thread. The first debate thread may be labeled as complete in response to a determination that a first condition is met.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
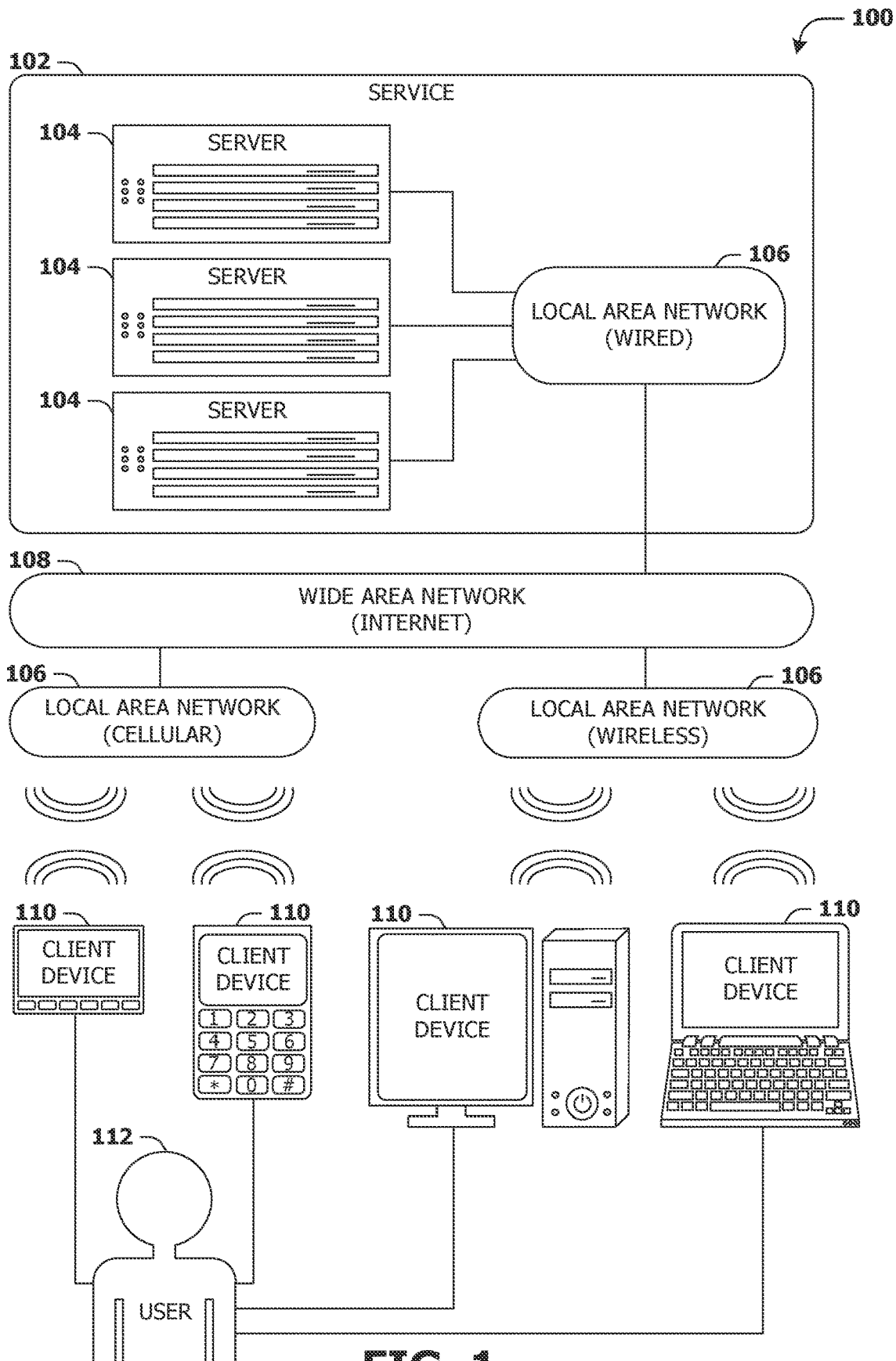
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
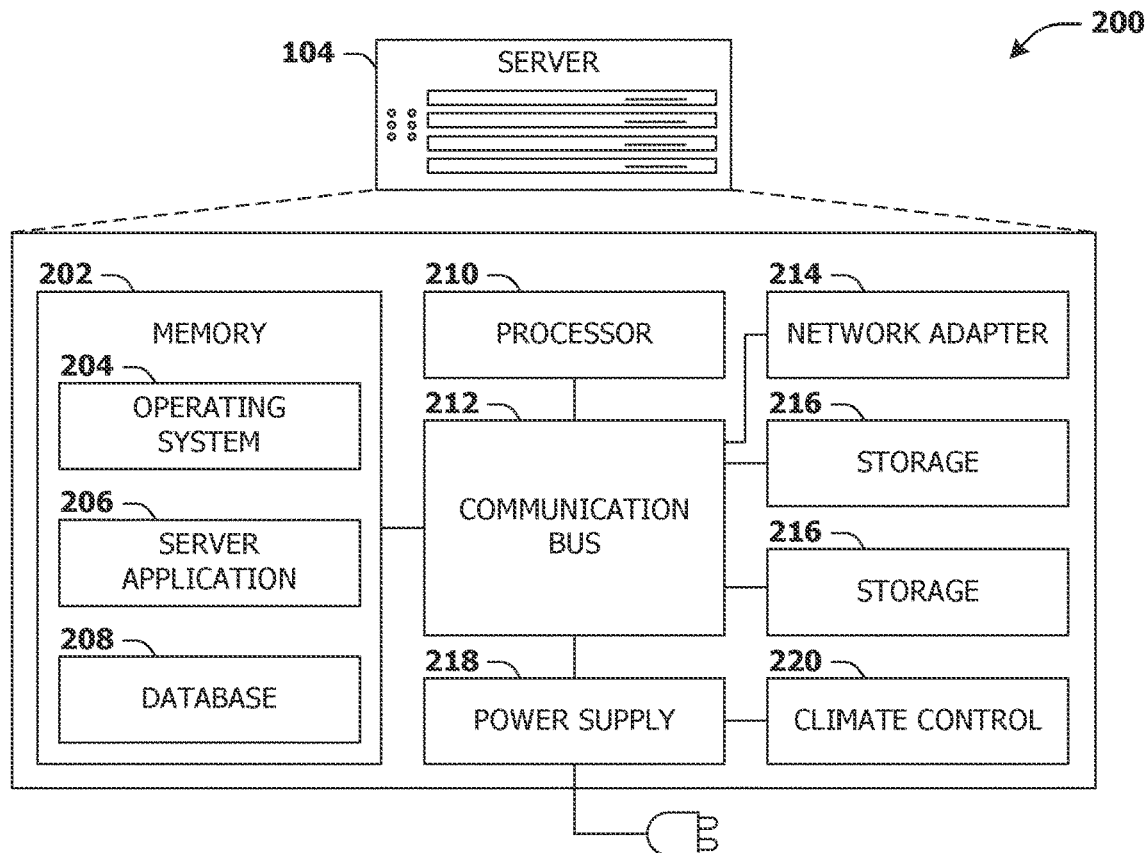
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
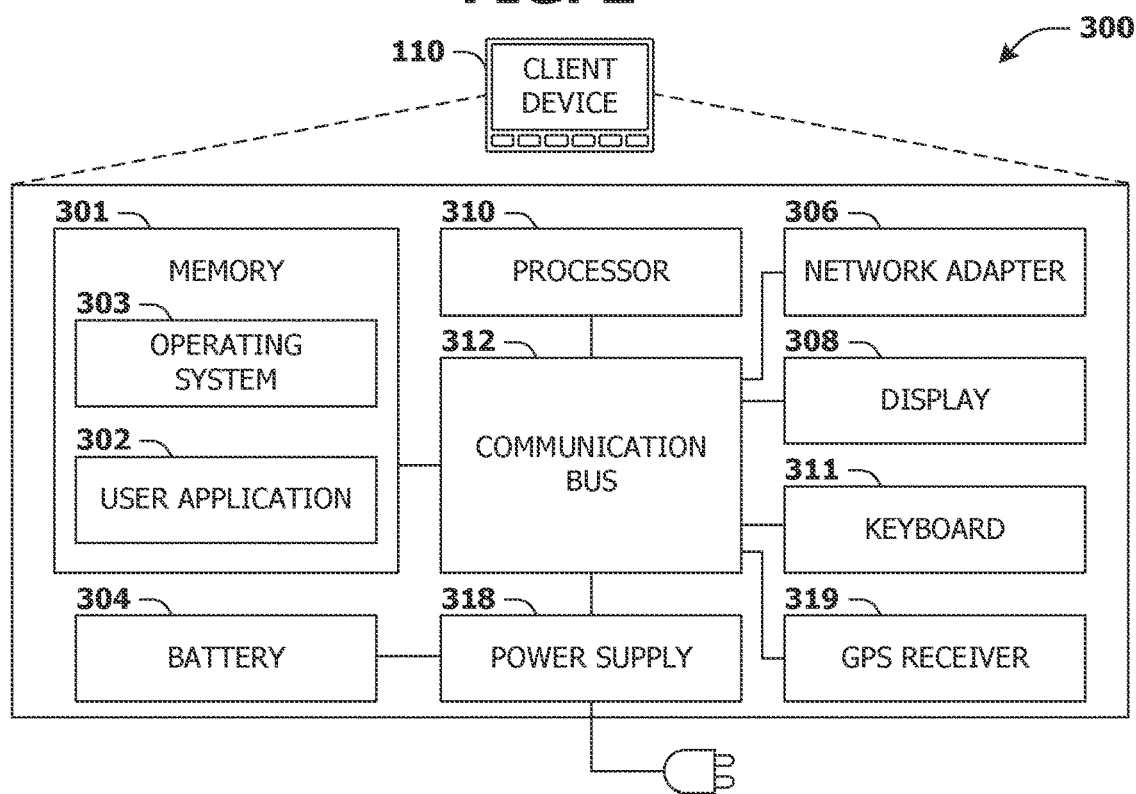
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for facilitating debate threads between users are provided. In some examples, users may use services, such as social media services, to post content, interact with posts, discuss issues with each other, etc. However, these services may have an open environment where discussions can be impeded by multiple users who fuel antagonism between groups through likes, dislikes, comments, etc. Therefore, discussions on these services may become chaotic and/or disorganized due to lack of civil dialogue, wherein extreme views may become heightened and/or personal with echoing opinions supporting one another, thereby causing users to participate in echo chambers and/or diminishing users' understanding of opposing perspectives. Promoting the exchange of opposing views in a civil manner may provide for better understanding of unique and/or opposing views, which is important for the progress and improvement of society.

Thus, in accordance with one or more of the techniques herein, a debate system is provided for facilitating debate threads between users. For example, the debate system may provide a platform for users to participate in debates on topics (that they are passionate about, for example). Alternatively and/or additionally, a user may view one or more debate threads, on the debate system, that may provide the user with an understanding of opposing points on one or more topics.

In some examples, a debate thread may be initiated by a first user account posting a starting argument post via the debate system, wherein a second user account may engage in a debate with the user by posting a response post, in the first debate thread, corresponding to a response to the starting argument post. In some examples, the debate system may not allow submission of at least one of posts, reaction signals, etc. by other user accounts (other than the first user account and the second user account) for inclusion in the first debate thread (e.g., reaction signals may correspond to reactions, such as at least one of comments, emojis, likes, dislikes, etc., to posts within the first debate thread). Accordingly, the first debate thread may not be impeded by non-participants of the first debate thread, thus preventing the non-participants from fueling antagonism between participants having opposing views.

In some examples, a post submitted by a user may be included in the first debate thread based upon a determination that the post meets one or more conditions (e.g., one or more conditions associated with a code of conduct of the debate system). For example, posts that do not meet the one or more conditions may not be included in the first debate thread, thereby providing for an environment in which opposing views are exchanged in a civil manner.

Figure 4A:
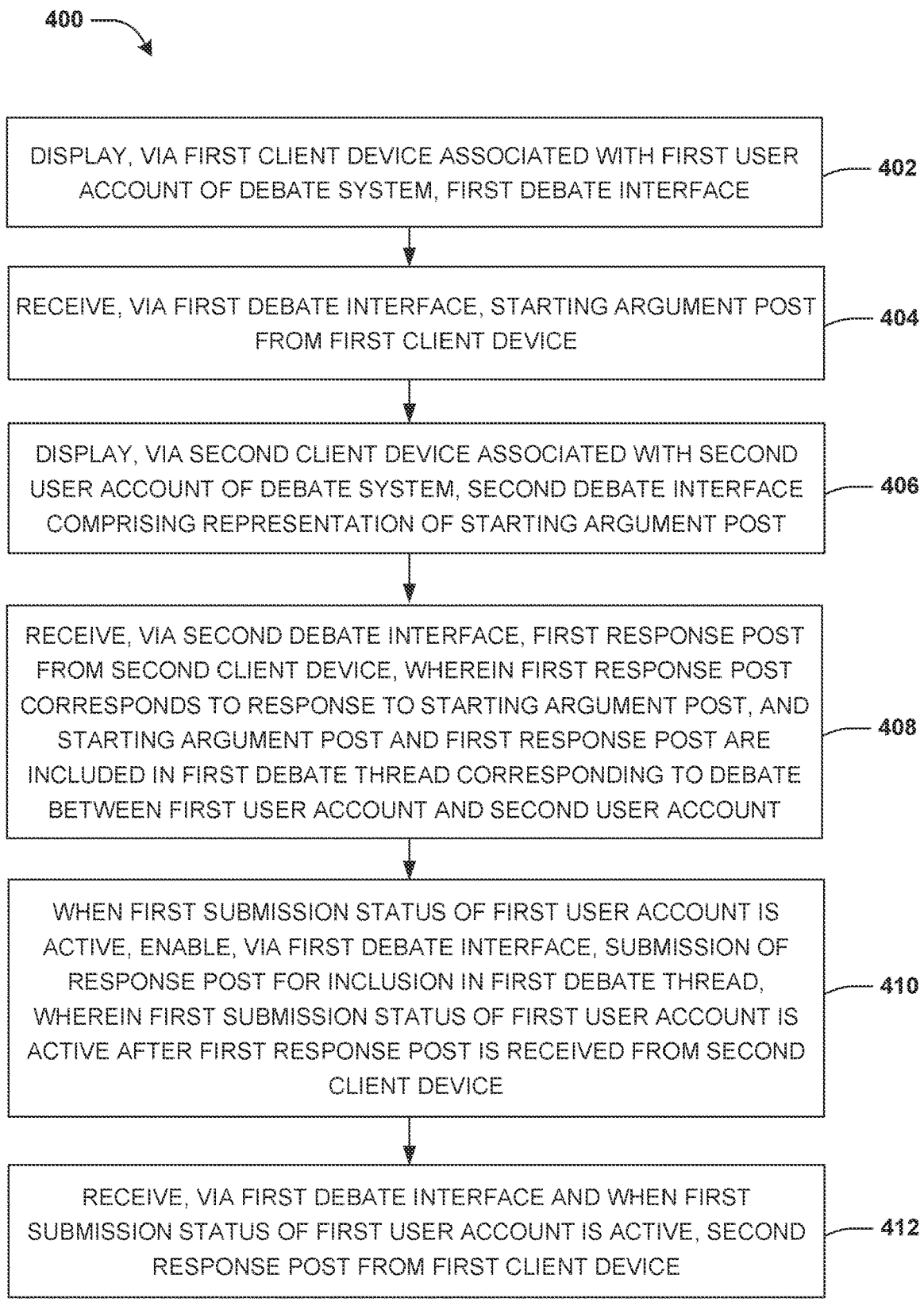
FIG. 4A is a flow chart illustrating an example method for facilitating debate threads between users.
Figure 4B:
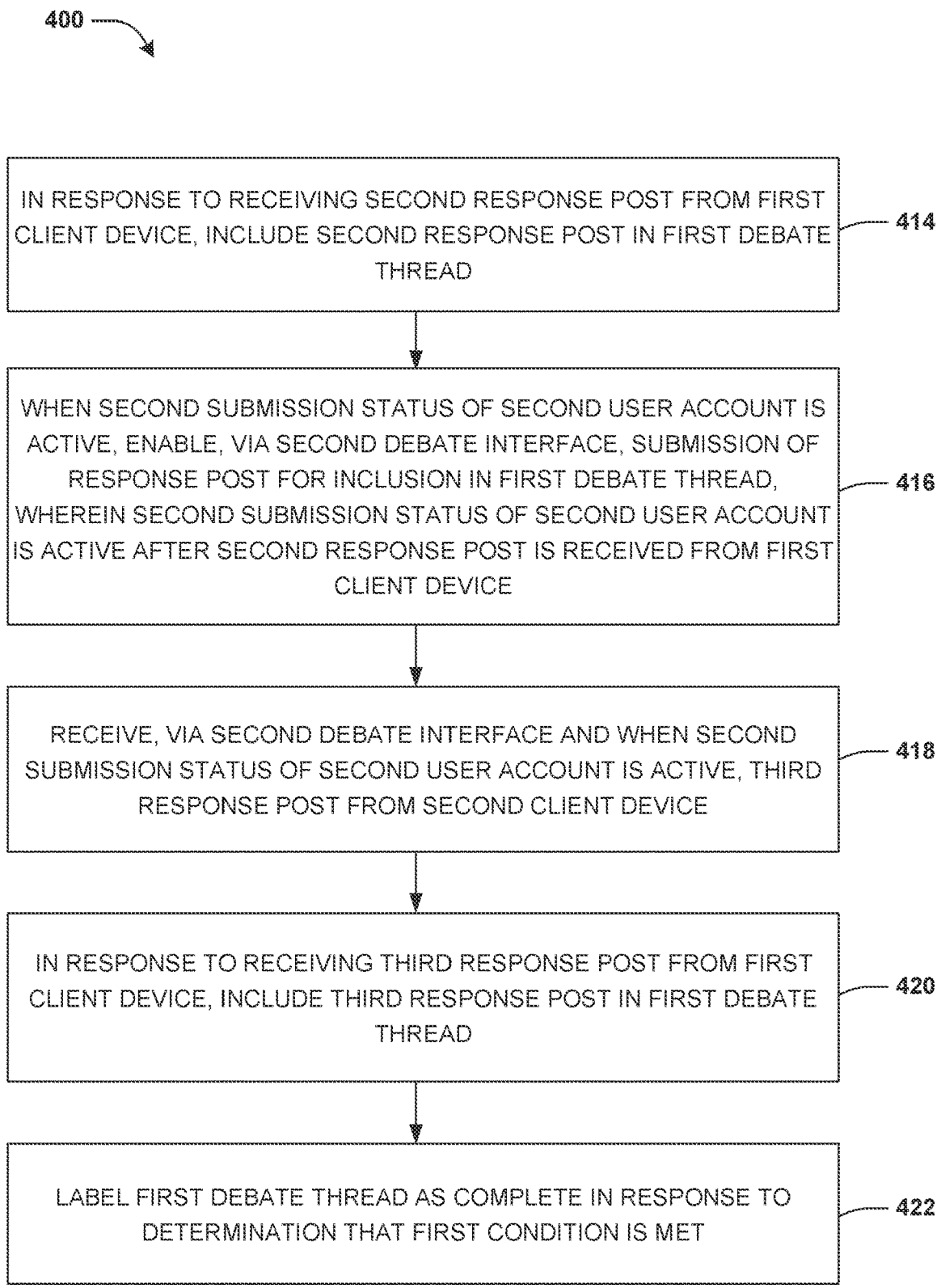
FIG. 4B is a flow chart illustrating an example method for facilitating debate threads between users.

An embodiment of facilitating debate threads between users is illustrated by an example method 400 of FIGS. 4A-4B, and is further described in conjunction with system 501 of FIGS. 5A-5M. A debate system may be provided. The debate system may provide a platform for users to engage in debates with each other on various topics.

At 402, a first debate interface is displayed via a first client device associated with a first user account of the debate system. In some examples, the first debate interface is displayed via at least one of a browser (e.g., a web browser), a debate platform application (e.g., a debate platform application provided by the debate system, such as at least one of a mobile application, a web application, etc.), etc. In an example, the first client device (and/or at least one of the browser, the debate platform application, etc.) may be logged into the first user account of the debate system and/or may be authorized to access information associated with the first user account. The first client device may comprise at least one of a laptop, a desktop computer, a phone, a computer, a wearable device, a smart device, a television, any other type of computing device, hardware, etc.

The first debate interface may provide the first client device with access to debate threads of the debate system. For example, debate threads may be stored in a debate thread database (e.g., a cloud database) of the debate system. The debate thread database may use one or more data models for data storage and/or data retrieval, such as at least one of graph data model, relational database, document database, non-relational database, etc. In an example, the debate thread database may comprise a plurality of sets of debate thread information associated with a plurality of debate threads. For example, for each debate thread of the plurality of debate threads, a set of debate thread information associated with the debate thread may be generated and/or stored in the debate thread database. In some examples, in response to receiving, from the first client device, a request to view a debate thread of the plurality of debate threads, a set of debate thread information comprising the debate thread may be retrieved from the debate thread database, a representation of the debate thread may be generated based upon the set of debate thread information, and/or the representation of the debate thread may be displayed via the first debate interface.

Figure 5A:
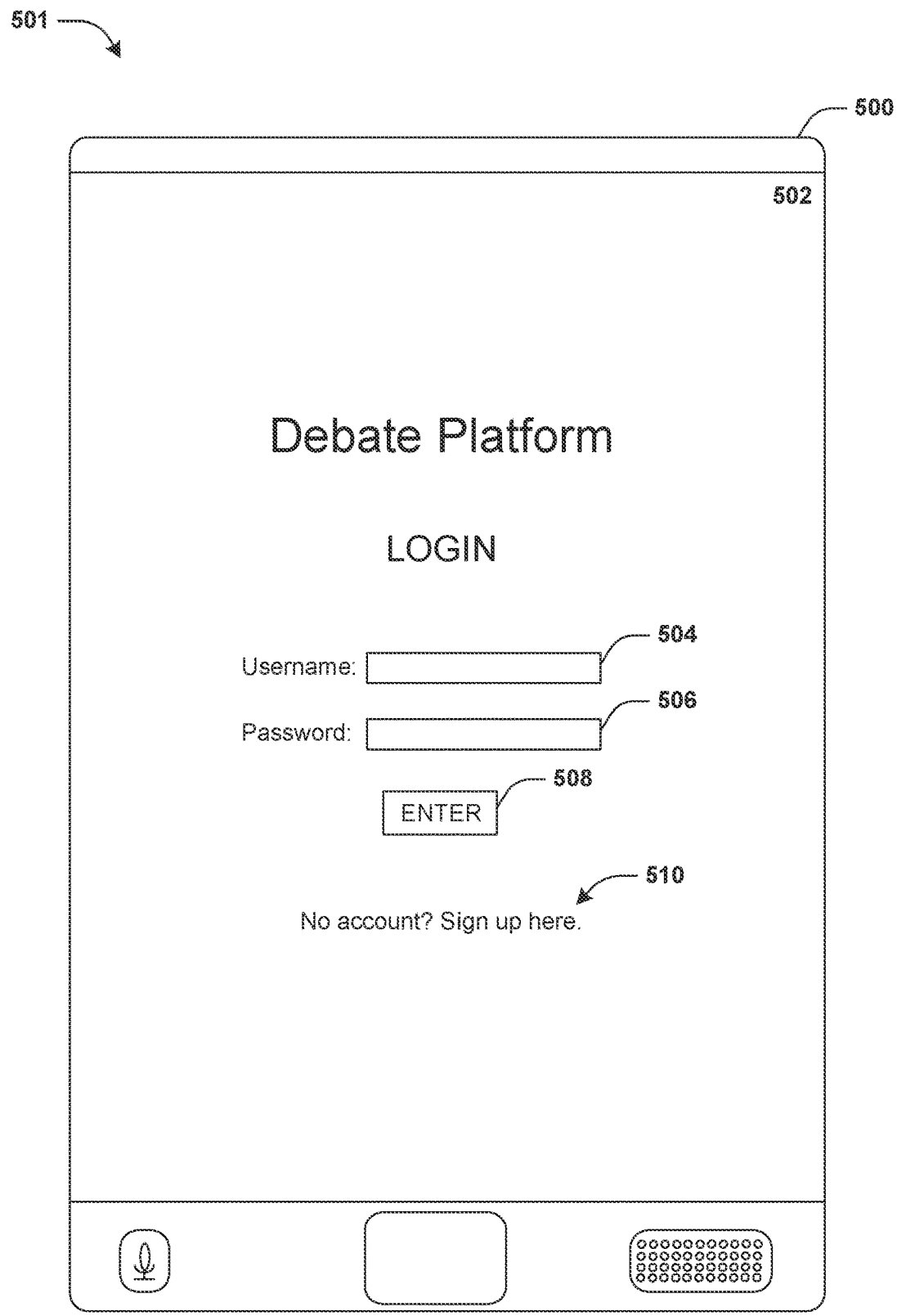
FIG. 5A is a component block diagram illustrating an example system for facilitating debate threads between users, where a first debate interface is displayed via a first client device.

FIG. 5A illustrates the first debate interface (shown with reference number 502) being displayed via the first client device (shown with reference number 500). In an example, the first debate interface may display a login interface. The login interface may comprise one or more input text fields for inputting login information. In an example, user credentials may be input using the one or more input text fields to log in to the first user account. For example, the user credentials may comprise a username of the first user account (e.g., the username may be entered into an input text field 504 of the one or more input text fields) and/or a password of the first user account (e.g., the password may be entered into an input text field 506 of the one or more input text fields). The user credentials may be authenticated in response to a selection of a login selectable input 508. In some examples, in response to successful authentication of the user credentials, the debate system may provide the first client device 500 with access to resources that the first user account is authorized to access.

Alternatively and/or additionally, the login interface may comprise a selectable input 510 for generating a new user account of the debate system. For example, in response to a selection of the selectable input 510, a sign up interface (not shown) may be displayed. The sign up interface may comprise one or more input text fields and/or one or more selectable inputs for inputting a set of sign up information associated with the new user account. The set of sign up information may comprise user credentials (e.g., a username and/or a password) and/or other information (e.g., a date of birth, a location, one or more topics of interest, etc.) associated with the new user account. In some examples, the user credentials of the set of sign up information may be unique user credentials for a first user of the first client device (e.g., the user credentials may be different than other pre-existing user credentials of the first user for other user accounts of other services other than the debate system). Alternatively and/or additionally, the user credentials of the set of sign up information may not be linked to another user account of the first user (e.g., the user credentials of the set of sign up information may not comprise an email address of the first user, a social media account name of the first user, etc.), such that personal user data associated with the new user account is not shared between the debate system, other social media applications and/or other email systems and/or to increase user privacy of the first user. In an example, the new user account (e.g., the first user account) may be generated for the first user in response to reception of the set of sign up information.

Figure 5B:
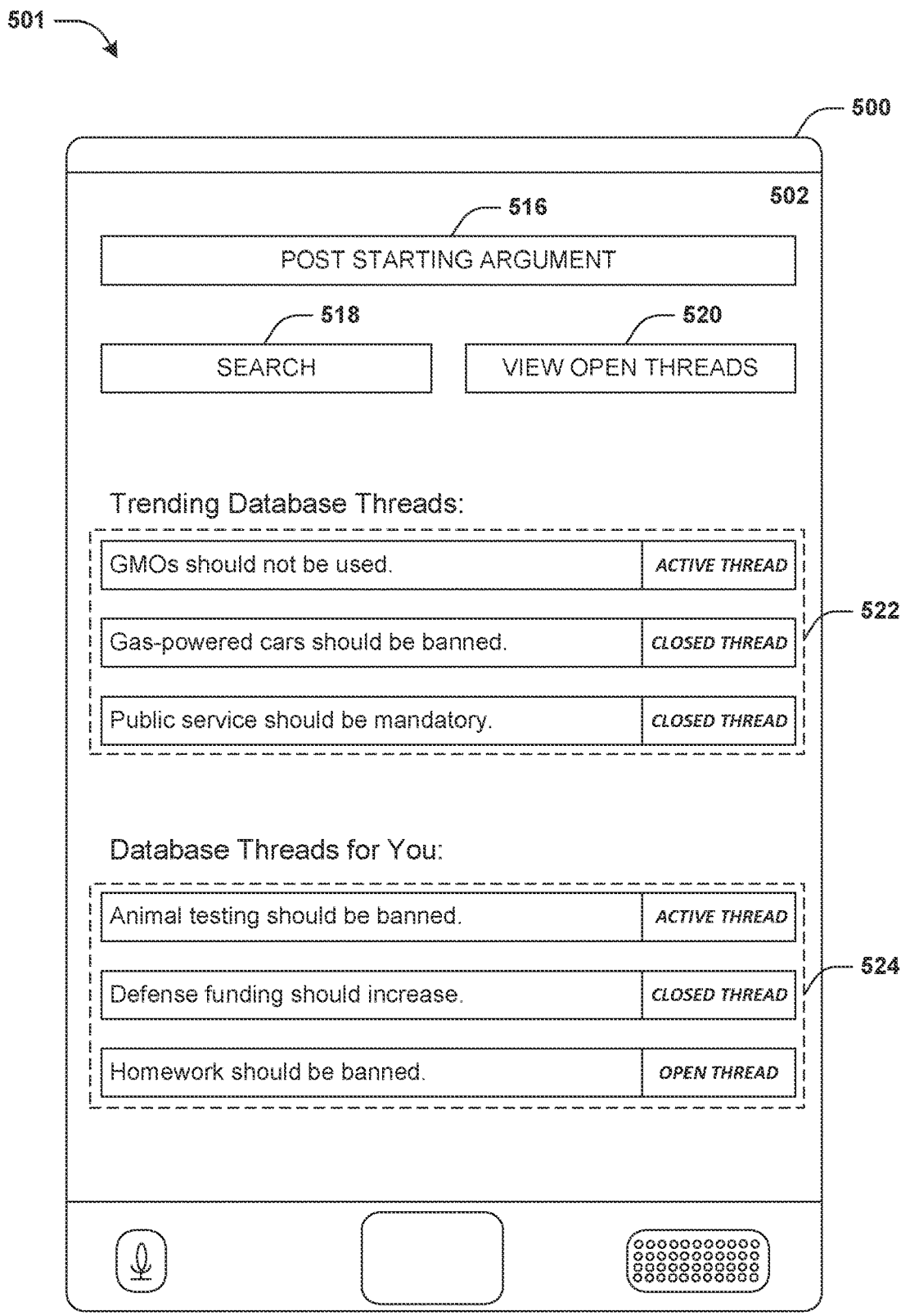
FIG. 5B is a component block diagram illustrating an example system for facilitating debate threads between users, where one or more lists of debate thread are displayed via a first debate interface.

In some examples, the first debate interface 502 may display one or more lists of debate thread items. For example, the first debate interface 502 may display the one or more lists of debate thread items in response to successfully logging into the first user account. FIG. 5B illustrates the one or more lists of debate thread items being displayed via the first debate interface 502. For example, the one or more lists of debate thread items may be displayed in a homepage of the first debate interface 502, such as page that is displayed upon logging into the first user account and/or that is displayed upon activating and/or opening the debate platform application comprising the first debate interface 502.

In some examples, the one or more lists of debate thread items comprise a first list of debate thread items 522 (e.g., a list of trending debate threads) and/or a second list of debate thread items 524 (e.g., a list of debate threads personalized for the first user account). In some examples, a first debate thread item of the one or more lists of debate thread items may comprise at least one of an indication of a first debate thread, an indication of a status of the first debate thread, an indication of a time associated with the first debate thread (e.g., at least one of an indication of a time at which the first debate thread was started, an indication of a time at which the first debate thread was completed, etc.), etc. For example, the indication of the first debate thread may comprise a title of the first debate thread and/or at least a portion of a starting argument post of the first debate thread (e.g., "GMOs should not be used."). In an example, the first debate thread item may comprise a link to view the first debate thread associated with the first debate thread item. In an example, in response to a selection of the first debate thread item, a representation of the first debate thread associated with the first debate thread item may be displayed via the first debate interface 502.

In some examples, the status of the first debate thread may be open, closed, or active (and/or other status).

The status of the first debate thread may be open if a starting argument post of the first debate thread is posted but a response to the starting argument post is not yet included (e.g., posted) in the first debate thread. In some examples, the first debate thread may be accessed and/or viewed via the first debate interface 502 when the status of the first debate thread is open (such as via a selection of the first debate thread item). In some examples, the first user account may join the first debate thread as a participant (by responding to the starting argument post, such as posting a response post in the first debate thread, for example) if the status of the first debate thread is open. The first debate thread item may comprise an indication "OPEN THREAD" (or other indication) to indicate that the status of the first debate thread is open.

The status of the first debate thread may be active if the first debate thread comprises a response to a starting argument post of the first debate thread and the first debate thread is not labeled as complete. For example, the status of the first debate thread may be active when there are two participants (e.g., two user accounts), wherein each participant of the two participants posted at least one post in the first debate thread. In an example, the status of the first debate thread may be set to active (e.g., changed from open to active) in response to a response post (e.g., a response to a starting argument post of the first debate thread) being included in the first debate thread. In some examples, the first debate thread may be accessed and/or viewed via the first debate interface 502 when the status of the first debate thread is active (such as via a selection of the first debate thread item). In some examples, the first user account may not join the first debate thread as a participant if the status of the first debate thread is active. For example, when the status of the first debate thread is active, the first debate interface 502 may disable submission of a response post for inclusion in the first debate thread by a non-participant (e.g., the debate system only allows participants of the first debate thread, such as the initial two participants of the first debate thread, to submit response posts for inclusion in the first debate thread when the status of the first debate thread is active). Alternatively and/or additionally, when the status of the first debate thread is active, the debate system may first debate interface 502 may disable submission of reaction signals in the third debate thread by a non-participant (e.g., reaction signals may correspond to reactions, such as at least one of comments, emojis, likes, dislikes, etc., to posts within the third debate thread). The first debate thread item may comprise an indication "ACTIVE THREAD" (or other indication) to indicate that the status of the first debate thread is active.

The status of the first debate thread may be closed if the first debate thread is labeled as complete. For example, the status of the first debate thread may be set to closed (e.g., changed from active to closed) in response to labeling the first debate thread as complete (e.g., the status of the first debate thread may remain active until the first debate thread is labeled as complete). In some examples, the first debate thread may be accessed and/or viewed via the first debate interface 502 when the status of the first debate thread is closed (such as via a selection of the first debate thread item). In some examples, the first user account may not join the first debate thread as a participant if the status of the first debate thread is closed. For example, when the status of the first debate thread is closed, the first debate interface 502 may not allow submission of a response post for inclusion in the first debate thread (e.g., when the status of the first debate thread is closed, the first debate interface 502 may not allow submission of a response post for inclusion in the first debate thread by any user account). The first debate thread item may comprise an indication "CLOSED THREAD" (or other indication) to indicate that the status of the first debate thread is closed.

In some examples, other debate thread items discussed and/or shown herein may have at least some of the features and/or characteristics provided herein with respect to the first debate thread item.

In some examples, the first list of debate thread items 522 may comprise debate thread items associated a first set of debate threads. In some examples, the first set of debate threads may be selected from the plurality of debate threads stored on the debate thread database. In some examples, the first set of debate threads may be selected based upon a determination that the first set of debate threads are top k trending debate threads of the plurality of debate threads. Based upon selection of the first set of debate threads, the first list of debate thread items 522 may be generated to comprise debate thread items associated with the first set of debate threads.

In an example, user activity associated with the plurality of debate threads may be analyzed to determine a plurality of trending scores associated with the plurality of debate threads. In an example, the plurality of trending scores may comprise a first trending score associated with a debate thread of the plurality of debate threads. The first trending score may be based upon a measure of user activity associated with the debate thread. For example, the first trending score may be a function of the measure of user activity, wherein an increase of the measure of user activity may result in an increase of the first trending score. Alternatively and/or additionally, the first trending score may be equal to the measure of user activity. In some examples, the measure of user activity may comprise a measure (e.g., a quantity or a frequency) of events in which the debate thread is accessed and/or displayed over a period of time (e.g., an hour, a day, a week, etc.). Alternatively and/or additionally, the measure of user activity may comprise a quantity of active viewers of the debate thread (e.g., a quantity of client devices that are currently displaying the debate thread and/or that currently have the debate thread opened). Other trending scores of the plurality of trending scores may be determined using one or more of the techniques provided herein with respect to determining the first trending score.

The first set of debate threads (for which debate thread items are included in the first list of debate thread items 522) may be selected from the plurality of debate threads based upon the plurality of trending scores. In some examples, the first set of debate threads may be selected from the plurality of debate threads based upon a determination that the first set of debate threads are associated with highest trending scores of the plurality of trending scores. Alternatively and/or additionally, the first set of debate threads may be selected from the plurality of debate threads based upon a determination that the first set of debate threads are associated with k highest trending scores of the plurality of trending scores (e.g., debate threads associated with the k highest trending scores of the plurality of trending scores may be included in the first set of debate threads). In an example where k is 5, 5 debate threads associated with 5 highest trending scores of the plurality of trending scores may be selected and/or included in the first set of debate threads. Alternatively and/or additionally, the plurality of debate threads may be ranked based upon the plurality of trending scores (e.g., a debate thread having a higher trending score of the plurality of trending scores is ranked higher than a debate thread having a lower trending score of the plurality of trending scores), and/or the top k ranked debate threads may be selected from among the plurality of debate threads (e.g., the top k ranked debate threads may be included in the first set of debate threads). Alternatively and/or additionally, the first set of debate threads may be selected from the plurality of debate threads based upon a determination that the first set of debate threads are associated with trending scores (of the plurality of trending scores) that meet (e.g., are equal to or exceed) a first threshold trending score (e.g., debate threads that are associated with trending scores, of the plurality of trending scores, that do not meet the first threshold trending score, may not be included in first set of debate threads).

In some examples, the first list of debate thread items 522 may be generated and/or updated in real time. For example, the first set of debate threads (for which debate thread items are included in the first list of debate thread items 522) may be generated and/or updated using updated user activity information associated with the plurality of debate threads (e.g., updated trending scores associated with the plurality of debate threads may be generated based upon the updated user activity information, wherein the first set of debate threads may be generated and/or updated based upon the updated trending scores).

In some examples, the second list of debate thread items 524 may comprise debate thread items associated a second set of debate threads. In some examples, the second set of debate threads may be selected from the plurality of debate threads stored on the debate thread database. Based upon selection of the second set of debate threads, the second list of debate thread items 524 may be generated to comprise debate thread items associated with the second set of debate threads.

In an example, historical activity information associated with the first user account may be analyzed to determine a plurality of debate thread scores associated with the plurality of debate threads. In an example, the historical activity information may comprise a set of historical search queries received from one or more client devices associated with the first user account (e.g., the set of historical search queries may comprise search queries that are input via the first debate interface 502 and/or that are used to generate search results using the debate system). Alternatively and/or additionally, the historical activity information may comprise a set of historical debate threads accessed by one or more client devices associated with the first user account (e.g., the set of historical debate threads may comprise debate threads that are accessed via the first debate interface 502). Alternatively and/or additionally, the historical activity information may comprise a set of historical posts posted on one or more debate threads by one or more client devices associated with the first user account (e.g., the set of historical posts may comprise posts that are posted on debate threads using the first debate interface 502). In an example, the plurality of debate thread scores may comprise a first debate thread score associated with a debate thread of the plurality of debate threads. The first debate thread score may be based upon a likelihood of the first user being interested in the debate thread and/or a likelihood that the first user would select (e.g., click on) a debate thread item associated with the debate thread if the debate thread item were presented via the first debate interface 502. In an example, the first debate thread score may be determined based upon one or more first topics of the debate thread and/or one or more second topics determined to be of interest to the first user. For example, the one or more first topics of the debate thread may be determined by analyzing one or more posts of the debate thread using one or more text analysis techniques, such as one or more natural language processing (NLP) techniques. Alternatively and/or additionally, the one or more second topics determined to be of interest to the first user may be determined by analyzing the historical activity information (e.g., the set of historical search queries, the set of historical debate threads and/or the set of historical posts) using one or more text analysis techniques, such as one or more NLP techniques. Alternatively and/or additionally, the one or more second topics determined to be of interest to the first user may be determined based upon user-input information (e.g., the first user-input information discussed below). In an example, the first debate thread score may be based upon a quantity of matching topics between the one or more first topics and the one or more second topics. For example, the first debate thread score may be a function of the quantity of matching topics, wherein an increase of the quantity of matching topics may result in an increase of the first debate thread score. In a first example, the one or more first topics may comprise "education" and "social issues" and the one or more second topics may comprise "education", "health", and "technology". Accordingly, in the first example, the quantity of matching topics may be one (e.g., "education" may be a matching topic between the one or more first topics and the one or more second topics). In a second example, the one or more first topics may comprise "education" and "technology" and the one or more second topics may comprise "education", "health", and "technology". Accordingly, in the second example, the quantity of matching topics may be two (e.g., "education" and "technology" may be matching topics between the one or more first topics and the one or more second topics). The first debate thread may be higher in the second example than the first example. Other debate thread scores of the plurality of debate thread scores may be determined using one or more of the techniques provided herein with respect to determining the first debate thread score.

The second set of debate threads (for which debate thread items are included in the second list of debate thread items 524) may be selected from the plurality of debate threads based upon the plurality of debate thread scores. In some examples, the second set of debate threads may be selected from the plurality of debate threads based upon a determination that the second set of debate threads are associated with highest debate thread scores of the plurality of debate thread scores. Alternatively and/or additionally, the second set of debate threads may be selected from the plurality of debate threads based upon a determination that the second set of debate threads are associated with n highest debate thread scores of the plurality of debate thread scores (e.g., debate threads associated with the n highest debate thread scores of the plurality of debate thread scores may be included in the second set of debate threads). In an example where n is 5, 5 debate threads associated with 5 highest debate thread scores of the plurality of debate thread scores may be selected and/or included in the second set of debate threads. Alternatively and/or additionally, the plurality of debate threads may be ranked based upon the plurality of debate thread scores (e.g., a debate thread having a higher debate thread score of the plurality of debate thread scores is ranked higher than a debate thread having a lower debate thread score of the plurality of debate thread scores), and/or the top n ranked debate threads may be selected from among the plurality of debate threads (e.g., the top n ranked debate threads may be included in the second set of debate threads). Alternatively and/or additionally, the second set of debate threads may be selected from the plurality of debate threads based upon a determination that the second set of debate threads are associated with debate thread scores (of the plurality of debate thread scores) that meet (e.g., are equal to or exceed) a first threshold debate thread score (e.g., debate threads that are associated with debate thread scores, of the plurality of debate thread scores, that do not meet the first threshold debate thread score, may not be included in second set of debate threads).

It may be appreciated that selecting the second set of debate threads and/or generating the second list of debate thread items 524 based upon the historical activity information associated with the first user account may create a closed-loop process allowing events (e.g., at least one of events in which searches are performed using the debate system, events in which debate threads are accessed and/or consumed using the debate system, events in which posts are submitted using the debate system, etc.) associated with the first user account as feedback to tailor parameters of the debate system (such as by determining the set of historical search queries, the set of historical debate threads and/or the set of historical posts based upon user activity of the first user account, determining debate thread scores associated with debate threads based upon the set of historical search queries, the set of historical debate threads and/or the set of historical posts, selecting debate threads from the plurality of debate threads for inclusion in the second list of debate thread items 524 based upon the debate thread scores, etc.). Closed-loop control may reduce errors and produce more efficient operation of a computer system which implements the debate system. The reduction of errors and/or the efficient operation of the computer system may improve operational stability and/or predictability of operation. Accordingly, using processing circuitry to implement closed loop control described herein may improve operation of underlying hardware of the computer system.

In an example, prior to selecting the second set of debate threads and/or generating the second list of debate thread items 524, a search query may be received via the first debate interface 502. A plurality of search results may be generated based upon the search query. Each search result of the plurality of search results comprises a link to view a debate thread and/or a post of a debate thread. A selection of a search result, of the plurality of search results, associated with a debate thread may be received. In response to receiving the selection of the search result, a representation of the debate thread may be displayed via the first debate interface 502. In some examples, the set of historical search queries comprise the search query. Alternatively and/or additionally, the set of historical debate threads may comprise the debate thread (accessed in response to the selection of the search result, for example).

In some examples, the first debate interface 502 may display a list of topics (not shown), such as a list of a top m most relevant topics to the first user account. In an example, topics of the list of topics may comprise (and/or may be selected from) the one or more second topics. In some examples, a topic of the list of topics may comprise a link to a debate thread, of the plurality of debate threads, associated with the topic. In an example, in response to a selection of a topic of the list of topics, a debate thread associated with the topic may be displayed via the first debate interface 502. In some examples, the list of topics may be displayed adjacent to (and/or laterally offset from) the first list of debate thread items 522 and/or the second list of debate thread items 524.

In some examples, the first debate interface 502 may comprise a selectable input 516 associated with posting a starting argument (to initiate a debate thread, for example), a selectable input 518 associated with performing a search of debate threads and/or posts using a search query, and/or a selectable input 520 associated with viewing debate threads that are open. In an example, in response to a selection of the selectable input 520 (e.g., "VEW OPEN THREADS"), a list of debate thread items (not shown) associated with a set of debate threads of the plurality of debate threads may be displayed via the first debate interface 502, wherein a status of the set of debate threads is open.

Figure 5C:
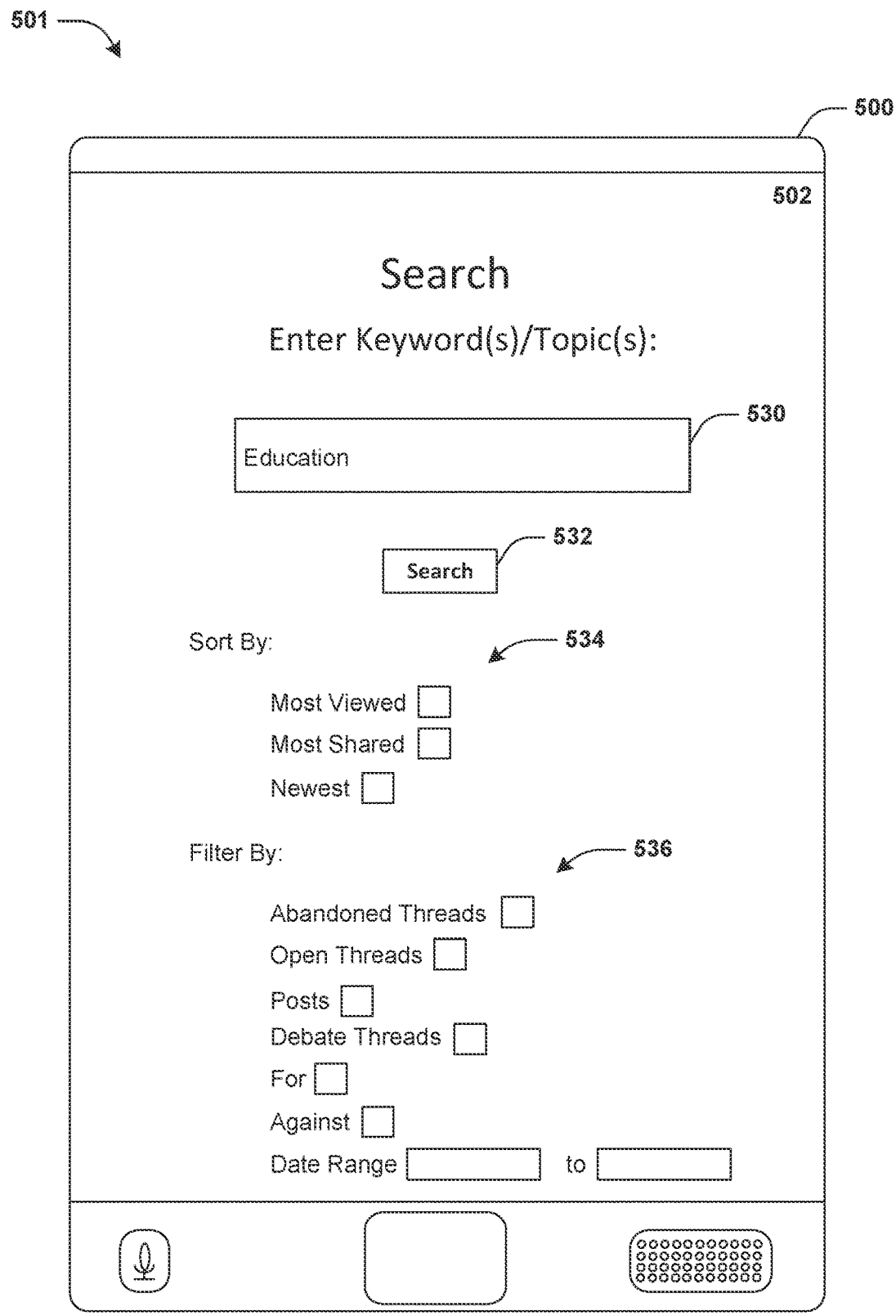
FIG. 5C is a component block diagram illustrating an example system for facilitating debate threads between users, where a first debate interface displays a search interface.

In some examples, in response to a selection of the selectable input 518 (e.g., "SEARCH"), the first debate interface 502 may display a search interface for entering a search query. FIG. 5C illustrates the first debate interface 502 displaying the search interface. The search interface may comprise a search field 530. For example, a first search query (e.g., "Education") may be entered into the search field 530. In some examples, the debate system may comprise a search system configured to generate search results based upon the first search query. In some examples, search results generated based upon the first search query may be associated with debate threads and/or posts (e.g., posts in debate threads). For example, one or more first search results generated based upon the first search query may correspond to one or more debate threads of the plurality of debate threads. Alternatively and/or additionally, one or more second search results generated based upon the first search query may correspond to one or more posts of one or more debate threads of the plurality of debate threads.

Alternatively and/or additionally, the search interface may comprise one or more sort selectable inputs 534. For example, the one or more sort selectable inputs 534 may be associated with one or more options for sorting search results generated based upon the first search query entered into the search field 530. In an example, based upon selection of a "Most Viewed" selectable input of the one or more sort selectable inputs 534, search results generated based upon the first search query may be arranged in decreasing order of quantity of views (e.g., the search results may comprise a search result corresponding to a first debate thread over a search result corresponding to a second debate thread if a quantity of views of the first debate thread is higher than a quantity of views of the second debate thread). A quantity of views of a debate thread may correspond to a quantity of events in which the debate thread is accessed and/or displayed. In an example, based upon selection of a "Most Shared" selectable input of the one or more sort selectable inputs 534, search results generated based upon the first search query may be arranged in decreasing order of quantity of shares (e.g., the search results may comprise a search result corresponding to a first debate thread over a search result corresponding to a second debate thread if a quantity of shares of the first debate thread is higher than a quantity of shares of the second debate thread). A quantity of shares of a debate thread may correspond to a quantity of events in which the debate thread is shared using a sharing function of the debate system (such as discussed herein with respect to FIG. 5L). In an example, based upon selection of a "Newest" selectable input of the one or more sort selectable inputs 534, search results generated based upon the first search query may be arranged by time, such as times at which debate threads are labeled as complete, times at which starting argument posts of debate threads are posted and/or other times associated with debate threads. In an example, the search results may comprise a search result corresponding to a first debate thread over a search result corresponding to a second debate thread if a time associated with the first debate thread (e.g., a time at which the first debate thread is labeled as complete or a time at which a starting argument post of the first debate thread is posted) is more recent than a time associated with the second debate thread (e.g., a time at which the second debate thread is labeled as complete or a time at which a starting argument post of the second debate thread is posted).

Alternatively and/or additionally, the search interface may comprise one or more filter selectable inputs 536. For example, the one or more filter selectable inputs 536 may be associated with one or more options for filtering search results generated based upon the first search query entered into the search field 530. In an example, based upon selection of an "Abandoned Threads" selectable input of the one or more filter selectable inputs 536, search results generated based upon the first search query may be filtered to merely comprise search results associated with debate threads that are labeled as abandoned threads (such as discussed below) and/or posts that are part of debate threads that are labeled as abandoned threads. Alternatively and/or additionally, based upon a selection of an "Open Threads" selectable input of the one or more filter selectable inputs 536, search results generated based upon the first search query may be filtered to merely comprise search results associated with debate threads that currently have a status of open. Alternatively and/or additionally, based upon a selection of a "Posts" selectable input of the one or more filter selectable inputs 536, search results generated based upon the first search query may be filtered to merely comprise search results that correspond to posts of debate threads (without comprising a search result that corresponds to a debate thread as a whole, for example). Alternatively and/or additionally, based upon a selection of a "Debate Threads" selectable input of the one or more filter selectable inputs 536, search results generated based upon the first search query may be filtered to merely comprise search results that correspond to debate threads (without comprising a search result that corresponds to merely a post of a debate thread, for example). Alternatively and/or additionally, based upon a selection of a "For" selectable input of the one or more filter selectable inputs 536, search results generated based upon the search query may be filtered to merely comprise search results associated with posts of debate threads that are determined to be in favor of (e.g., in support of) a stance, a topic and/or keyword in the first search query. For example, a post of a debate thread may be determined to be in favor of the topic and/or the keyword by analyzing the post using one or more text analysis techniques, such as one or more NLP techniques. Alternatively and/or additionally, based upon a selection of a "Against" selectable input of the one or more filter selectable inputs 536, search results generated based upon the search query may be filtered to merely comprise search results associated with posts of debate threads that are determined to be against (e.g., opposed to) a stance, a topic and/or keyword in the first search query. For example, a post of a debate thread may be determined to be against the topic and/or the keyword by analyzing the post using one or more text analysis techniques, such as one or more NLP techniques. Alternatively and/or additionally, a time window (e.g., a time between two dates) may be input via one or more "Date Range" selectable inputs of the one or more filter selectable inputs 536, wherein search results generated based upon the search query may be filtered to merely comprise search results associated with debate threads associated with times within the time window. For example, the search results may comprise one or more search results corresponding to one or more posts that are posted within the time window. Alternatively and/or additionally, the search results may comprise one or more search results corresponding to one or more debate threads that are initiated (via posting a starting argument of the debate thread, for example) and/or labeled as complete within the time window.

Figure 5D:
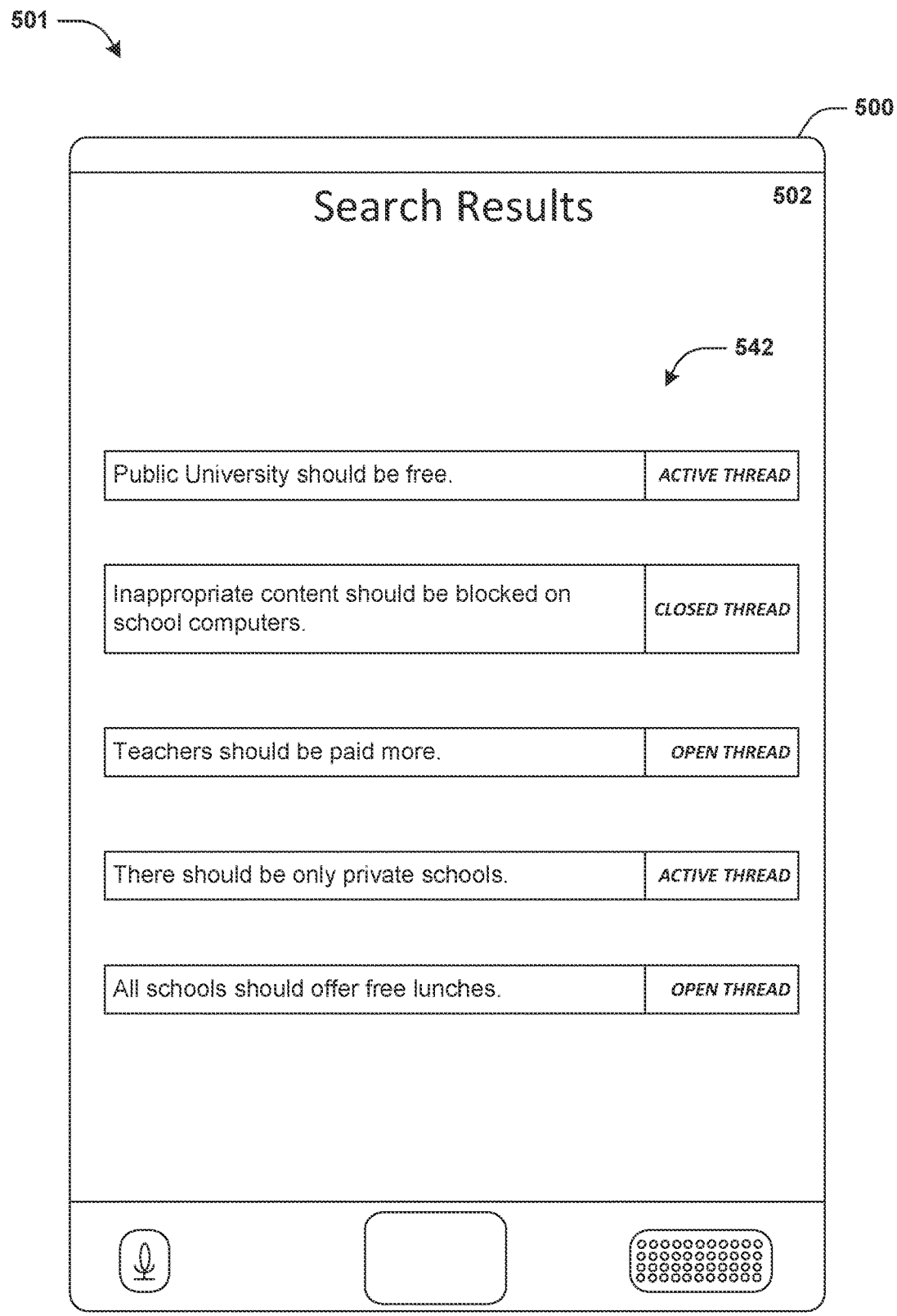
FIG. 5D is a component block diagram illustrating an example system for facilitating debate threads between users, where a set of search results is displayed via a first debate interface.

In some examples, the search interface may comprise a search selectable input 532. In response to selection of the search selectable input 532, the search system may generate a set of search results based upon the first search query and/or based upon one or more selections of one or more selectable inputs of the one or more sort selectable inputs 534 and/or the one or more filter selectable inputs 536. The set of search results may be displayed via the first debate interface 502. FIG. 5D illustrates the set of search results (shown with reference number 542) being displayed via the first debate interface 502. In some examples, a search result of the set of search results 542 may comprise an indication of a debate thread and/or a post associated with the search result (e.g., the indication may comprise at least a portion of the debate thread and/or the post), an indication of a status associated with the debate thread and/or the post, an indication of a time associated with the debate thread and/or the post, etc. Alternatively and/or additionally, the search result may comprise a link to view the debate thread and/or the post (e.g., in response to a selection of the search result, a representation of the debate thread and/or the post may be displayed via the first debate interface 502).

Figure 5E:
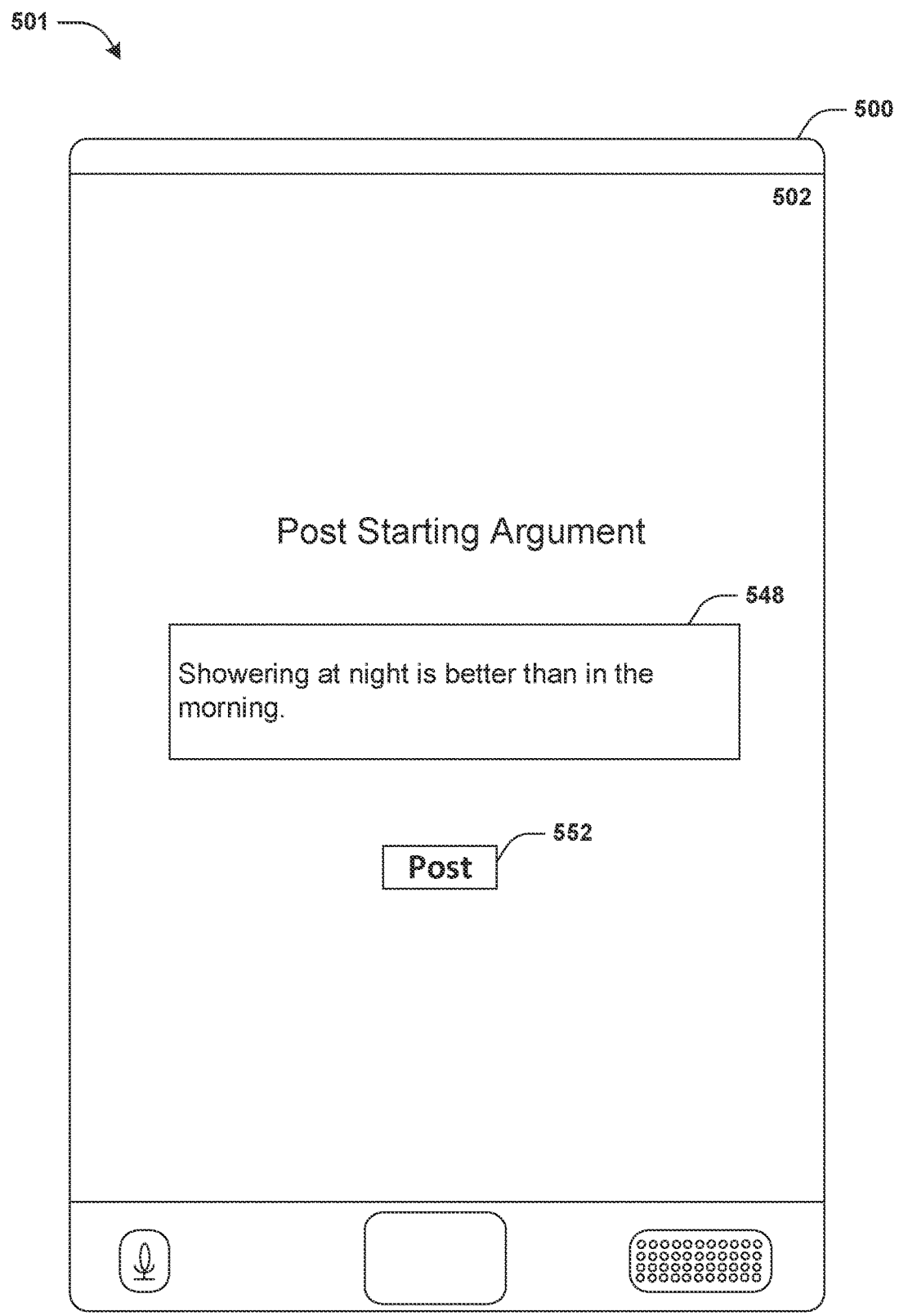
FIG. 5E is a component block diagram illustrating an example system for facilitating debate threads between users, where a first debate interface displays an input text field for inputting a starting argument post.

FIG. 5E illustrates the first debate interface 502 displaying an input text field 548 for inputting a starting argument post. In an example, the input text field 548 may be displayed in response to a selection of the selectable input 516 (shown in FIG. 5B). In some examples, a first starting argument post (e.g., "Showering at night is better than in the morning.") may be entered into the input text field 548. At 404, the first starting argument post may be received from the first client device 500. For example, the first starting argument post may be received (by the debate system, for example) in response to a selection of a selectable input 552 (e.g., a "post" selectable input for posting the first starting argument post).

In some examples, the debate system may limit posts in debate threads to a maximum post length. For example, the maximum post length may correspond to a maximum quantity of words (e.g., 20 words, 200 words or other quantity of words) and/or a maximum quantity of characters (e.g., 100 characters, 1000 characters or other quantity of characters) of a post to be included in a debate thread. In an example, if text having a higher post length than the maximum post length is entered into the input text field 548, the first debate interface 502 may display an indication that the text exceeds the maximum post length and/or an instruction to reduce the post length of the text to successfully submit the text.

In some examples, the debate system may limit posts in debate threads to comprise merely one or more first types of content, such as text, emojis, videos, voice recordings and/or one or more other types of content. In an example, the one or more first types of content comprise text (e.g., text can be included in posts in the debate threads) and/or do not comprise voice recordings, videos and/or one or more other types of content (e.g., the debate system does not allow voice recordings, videos and/or one or more other types of content to be included in posts of debate threads).

In some examples, the first starting argument post may be included in a third debate thread (e.g., the first starting argument post may be included in the third debate thread in response to receiving the first starting argument post). For example, the third debate thread may be generated to comprise the first starting argument post in response to receiving the first starting argument post. Alternatively and/or additionally, in response to receiving the first starting argument post, a first set of debate thread information associated with the third debate thread may be generated and/or stored in the debate thread database. For example, the first set of debate thread information may comprise at least one of the first starting argument post, an indication of the first user account associated with the first starting argument post (e.g., the indication of the first user account may comprise a username of the first user account), an indication of a time at which the first starting argument post is received, etc.

In some examples, the first starting argument post may be included in the third debate thread and/or the first starting argument post may be made accessible to users of the debate system based upon a determination that the first starting argument post meets one or more conditions (e.g., at least some of the one or more first conditions discussed below).

In some examples, in response to receiving, from a client device, a request to view the starting argument post and/or the third debate thread, the first set of debate thread information comprising the starting argument post and/or the third debate thread may be retrieved from the debate thread database, a representation of the starting argument post and/or the third debate thread may be generated based upon the first set of debate thread information, and/or the representation of the starting argument post and/or the third debate thread may be displayed via a debate interface (e.g., the request may be received from the client device via the debate interface).

Figure 5F:
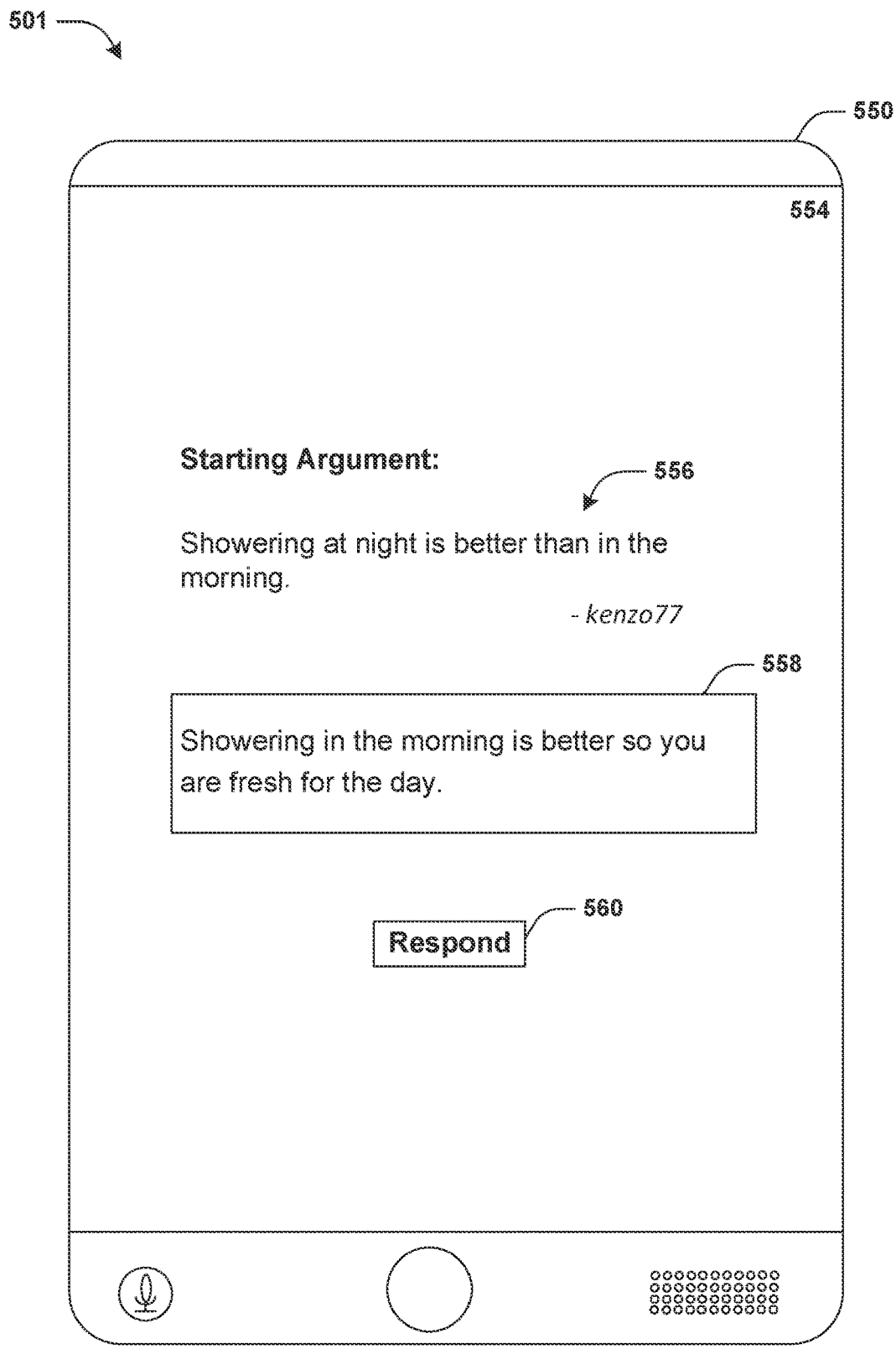
FIG. 5F is a component block diagram illustrating an example system for facilitating debate threads between users, where a representation of a first starting argument post is displayed via a second debate interface on a second client device.

At 406, a second debate interface comprising a representation of the first starting argument post may be displayed via a second client device associated with a second user account of the debate system (e.g., the second client device may be logged into the second user account of the debate system). FIG. 5F illustrates a representation of the first starting argument post (shown with reference number 556) being displayed via the second debate interface (shown with reference number 554) on the second client device (shown with reference number 550). In an example, an indication of the first user account (e.g., the username of the first user account, such as "kenzo77" in FIG. 5F) that posted the first starting argument post 556 may be displayed via the second debate interface 554. The second debate interface 554 may display an input text field 558 for inputting a response post (corresponding to a response to the first starting argument post 556, for example). In some examples, a first response post (e.g., "Showering in the morning is better so you are fresh for the day.") may be entered into the input text field 558. At 408, the first response post may be received from the second client device 550. For example, the first response post may be received (by the debate system, for example) in response to a selection of a selectable input 560 (e.g., a "respond" selectable input for posting a response to the first starting argument post 556). The first response post may correspond to a response to the first starting argument post 556.

In some examples, the first response post may be included in the third debate thread (e.g., the third debate thread may correspond to a debate between the first user account and the second user account). In some examples, the debate system may limit a quantity of participants in the third debate thread to a maximum quantity of participants. For example, the maximum quantity of participants (that can submit posts in the third debate thread when a status of the debate thread is active, for example) may be two (e.g., the debate system may not allow for user accounts other than the first user account and the second user account to submit posts in the third debate thread when the status of the third debate thread is active). Embodiments are contemplated in which the maximum quantity of participants in a debate thread is greater than two.

In some examples, information comprising at least one of the first response post, an indication of the second user account associated with the first response post (e.g., the indication of the second user account may comprise a username of the second user account), an indication of a time at which the first response post is received, etc. may be stored in the debate thread database (e.g., the information may be included in the first set of debate thread information associated with the third debate thread). Alternatively and/or additionally, in response to including the first response post in the third debate thread (and/or in response to receiving the first response post from the second client device 550), a status of the third debate thread may be changed from open to active (and/or an indication of the status of the third debate thread being active may be included in the first set of debate thread information associated with the third debate thread). When the status of the third debate thread is active, the third debate thread may be accessed and/or viewed by users of the debate system (e.g., the third debate thread may be accessed and/or viewed using debate interfaces associated with the debate system). For example, when the status of the third debate thread is active, the third debate thread may be accessed and/or viewed by non-participants of the third debate thread (e.g., user accounts other than the first user account and/or the second user account) and/or guest users (that are not logged into a user account of the debate system). In some examples, when the status of the third debate thread is active, the debate system does not allow non-participants of the third debate thread (e.g., user accounts other than the first user account and/or the second user account) and/or guest users (that are not logged into a user account of the debate system) to submit response posts for inclusion in the third debate thread. Alternatively and/or additionally, when the status of the third debate thread is active, the debate system may not allow non-participants of the third debate thread (e.g., user accounts other than the first user account and/or the second user account) and/or guest users (that are not logged into a user account of the debate system) to submit reaction signals in the third debate thread (e.g., reaction signals may correspond to reactions, such as at least one of comments, emojis, likes, dislikes, etc., to posts within the third debate thread).

In an example, when the status of the third debate thread is active, the debate system may provide a representation of the third debate thread to be displayed via a client device of a non-participant of the debate thread (e.g., a user account other than the first user account and/or the second user account) and/or a guest user (that is not logged into a user account of the debate system). The representation of the third debate thread may be displayed via a debate interface on the client device. The representation of the third debate thread may be a real-time representation of the third debate thread (e.g., the representation may comprise one or more representations of posts of the third debate thread that have been included in the third debate thread as of a time at which the representation of the third debate thread is loaded and/or displayed on the client device). When the status of the third debate thread is active, the debate interface may disable submission of response posts for inclusion in the third debate thread. Alternatively and/or additionally, when the status of the third debate thread is active, the debate interface may disable submission of reaction signals in the third debate thread. In some examples, the debate interface may display a share debate thread selectable input (e.g., a share debate thread selectable input 527 discussed with respect to FIG. 5L) associated with the sharing function of the debate system (such as discussed herein with respect to FIG. 5L).

In some examples, in response to receiving the first response post from the second client device 550, the first response post may be analyzed to determine whether or not the first response post meets one or more first conditions. The first response post may be included in the third debate thread based upon a determination that the first response post meets the one or more first conditions.

In an example, the one or more first conditions may comprise: (i) a first condition that the first response post is coherent; (ii) a second condition that the first response post does not comprise violent language; (iii) a third condition that the first response post does not comprise threatening language; (iv) a fourth condition that the first response post does not comprise insults; (v) a fifth condition that the first response post does not comprise a link to an internet resource; and/or (vi) a sixth condition that the first response post is relevant to the third debate thread.

In some examples, whether or not one or more conditions of the one or more first conditions are met may be determined using one or more one or more text analysis techniques, such as one or more NLP techniques.

In an example, whether or not the first condition is met may be determined using a first NLP model (e.g., a machine learning model) comprising at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc. In an example, the first NLP model may be trained using training data comprising one or more sets of text. The training data may comprise labeled data (e.g., one or more sets of text of the training data that are determined to be incoherent may be labeled as "incoherent" and/or one or more sets of text of the training data that are determined to be coherent may be labeled as "coherent"). The first NLP model may be trained and/or configured to determine whether an input set of text is coherent or incoherent. In an example, it may be determined that the first condition is met based upon the first NLP model outputting a determination that the first response post (input to the first NLP model) is coherent. Alternatively and/or additionally, it may be determined that the first condition is not met based upon the first NLP model outputting a determination that the first response post (input to the first NLP model) is incoherent. Alternatively and/or additionally, the first NLP model may output a first coherency score indicative of a level of coherency of the first response post. In some examples, it may be determined that the first condition is met based upon the first coherency score output by the first NLP model meeting (e.g., exceeding or being equal to) a threshold coherency score. Alternatively and/or additionally, it may be determined that the first condition is not met based upon the first coherency score output by the first NLP model not meeting (e.g., being less than) the threshold coherency score.

In some examples, the first NLP model may be developed (e.g., updated and/or retrained), such as periodically. For example, posts submitted to the debate system for inclusion in debate threads may be used to develop (e.g., update and/or retrain) the first NLP model to increase accuracy and/or performance of the first NLP model in determining whether or not a post is coherent and/or determining a coherency score of a post (e.g., the first NLP model may be developed using information, such as the posts, to provide insights on at least one of words, colloquialisms, slangs, sentence structures, etc.).

In an example, whether or not the sixth condition is met may be determined using a second NLP model (e.g., a machine learning model) comprising at least one of a neural network, a tree-based model, a machine learning model used to perform linear regression, a machine learning model used to perform logistic regression, a decision tree model, a SVM, a Bayesian network model, a k-NN model, a K-Means model, a random forest model, a machine learning model used to perform dimensional reduction, a machine learning model used to perform gradient boosting, etc. The second NLP model may be trained and/or configured to determine whether or not a first input set of text is relevant to a second input set of text. In some examples, the first input set of text may comprise the first response post (input to the second NLP model, for example) and/or the second input set of text may comprise one or more posts in the third debate thread (e.g., the first starting argument post 556). In some examples, the second NLP model may determine one or more third topics based upon the first input set of text and/or one or more fourth topics based upon the second input set of text. For example, topic analysis may be performed on the first input set of text and/or the second input set of text to determine the one or more third topics and/or the one or more fourth topics. In an example, whether or not the first response post is relevant to the third debate thread may be determined based upon a second quantity of matching topics between the one or more third topics and the one or more fourth topics. In an example, a first relevance score, indicative of a level of relevance of the first response post to the third debate thread, may be generated based upon the one or more third topics and/or the one or more fourth topics. For example, the first relevance score may be determined based upon the second quantity of matching topics. In an example, the first relevance score may be a function of the second quantity of matching topics, wherein an increase of the second quantity of matching topics may result in an increase of the first relevance score. In some examples, it may be determined that the sixth condition is met based upon the first relevance score meeting (e.g., exceeding or being equal to) a threshold relevance score. Alternatively and/or additionally, it may be determined that the sixth condition is not met based upon the first relevance score not meeting (e.g., being less than) the threshold relevance score.

In some examples, the second NLP model may be developed (e.g., updated and/or retrained), such as periodically. For example, posts submitted to the debate system for inclusion in debate threads may be used to develop (e.g., update and/or retrain) the second NLP model to increase accuracy and/or performance of the second NLP model in determining whether or not a post is relevant to a debate thread and/or determining a relevance score of a post (e.g., the second NLP model may be developed using information, such as the posts, to provide insights on at least one of words, colloquialisms, slangs, sentence structures, etc.).

It may be appreciated that determining whether or not a post meets the first condition and/or the sixth condition, and/or not including a post that does not meet the first condition and/or the sixth condition in a debate thread, provides for higher quality posts being included in the debate thread and/or may prevent lower quality posts from being included in the debate thread. For example, the post not meeting the first condition may be reflective of the post not being clear and/or comprehensible to a reader. Alternatively and/or additionally, the post not meeting the sixth condition may be reflective of the post comprising information irrelevant to the debate thread. In an example in which the post comprises spam (e.g., promotional information of a business that may be unrelated to the debate thread), it may be determined that the post does not meet the sixth condition, and thus the post may not be included in the debate thread.

In some examples, whether or not the second condition, the third condition and/or the fourth condition are met may be determined based upon one or more lists of prohibited language. For example, the one or more lists of prohibited language may comprise terms (e.g., words and/or phrases) that are violent, threatening and/or insulting. In an example, it may be determined that the second condition, the third condition and/or the fourth condition are met based upon a determination that the first response post does not comprise a term from the one or more lists of prohibited language. Alternatively and/or additionally, it may be determined that the second condition, the third condition and/or the fourth condition are met based upon a determination that the first response post comprises a term from the one or more lists of prohibited language.

In some examples, the first response post may be analyzed to determine whether or not the fifth condition is met. For example, the first response post may be analyzed to determine whether or not the first response post comprises at least one of a web address (e.g., a Uniform Resource Locator (URL)), a domain name, etc. In an example, it may be determined that the first response post meets the fifth condition based upon a determination that the first response post does not comprise at least one of a web address of an internet resource (e.g., a web page), a domain name of an internet resource (e.g., a web page), etc. Alternatively and/or additionally, it may be determined that the first response post does not meet the fifth condition based upon a determination that the first response post comprises at least one of a web address of an internet resource (e.g., a web page), a domain name of an internet resource (e.g., a web page), etc.

Alternatively and/or additionally, the fifth condition may be met if the first response post comprises a link to an internet resource of a plurality of allowed internet resources. The fifth condition may not be met if the first response post comprises a link to an internet resource that is not an internet resource of the plurality of allowed internet resources. In some examples, the plurality of allowed internet resources may comprise at least one of web pages, websites, etc. for which links are allowed to be posted via the debate system. In an example, the plurality of allowed internet resources may comprise at least one of internet resources provided by the debate system, internet resources that provide scientific and/or evidence-based papers, internet resources that provide peer-reviewed papers, etc. In an example, it may be determined that the first response post meets the fifth condition based upon a determination that the first response post does not comprise a link to an internet resource or merely comprises one or more links to one or more internet resources of the plurality of allowed internet resources. Alternatively and/or additionally, it may be determined that the first response post does not meet the fifth condition based upon a determination that the first response post comprises a link to an internet resource that does not match an internet resource of the plurality of allowed internet resources.

In some examples, the first response post may not be included in the third debate thread based upon a determination that the first response post does not meet a condition of the one or more first conditions. Alternatively and/or additionally, one or more first operations may be performed in response to a determination that the first response post does not meet a condition of the one or more first conditions. In some examples, the one or more first operations may comprise storing an indication that the first response post violates a code of conduct of the debate system. Alternatively and/or additionally, the one or more first operations may comprise transmitting a message (e.g., a notification, such as at least one of an email, an instant message, etc.) to a client device (e.g., the second client device 550) associated with the second user account, wherein the message is indicative of the first response post violating the code of conduct of the debate system. Alternatively and/or additionally, the one or more first operations may comprise providing an opportunity for the second user account to provide a response post (that meets the one or more first conditions, for example) for inclusion in the third debate thread. For example, the second debate interface 554 may display an input text field (e.g., the input text field 558) and/or a selectable input (e.g., the selectable input 560) such that the second user associated with the second user account may submit a replacement response post (e.g., a replacement of the first response post) for inclusion in the third debate thread. In some examples, in response to receiving the replacement response post, the replacement response post may be analyzed to determine whether or not the replacement response post meets the one or more first conditions.

In some examples, in response to a determination that the replacement response post meets the one or more first conditions, the replacement response post may be included in the third debate thread. In an example, information comprising at least one of the replacement response post, an indication of the second user account associated with the replacement response post (e.g., the username of the second user account), an indication of a time at which the replacement response post is received, etc. may be stored in the debate thread database (e.g., the information may be included in the first set of debate thread information associated with the third debate thread).

In some examples, in response to a determination that the replacement response post does not meet a condition of the one or more first conditions, the replacement response post may not be included in the third debate thread. Alternatively and/or additionally, in response to a determination that the replacement response post does not meet a condition of the one or more first conditions, at least some of the one or more first operations may be performed. Alternatively and/or additionally, in response to a determination that the replacement response post does not meet a condition of the one or more first conditions, the debate system may place one or more limitations on the second user account. The one or more limitations may comprise not allowing the second user account to submit a post for inclusion in the third debate thread. Alternatively and/or additionally, the one or more limitations may comprise a post suspension for the second user account (e.g., the debate system may not allow the second user account to submit posts on the debate system for a duration of time, such as 24 hours, 72 hours, a week, etc.).

Figure 5G:
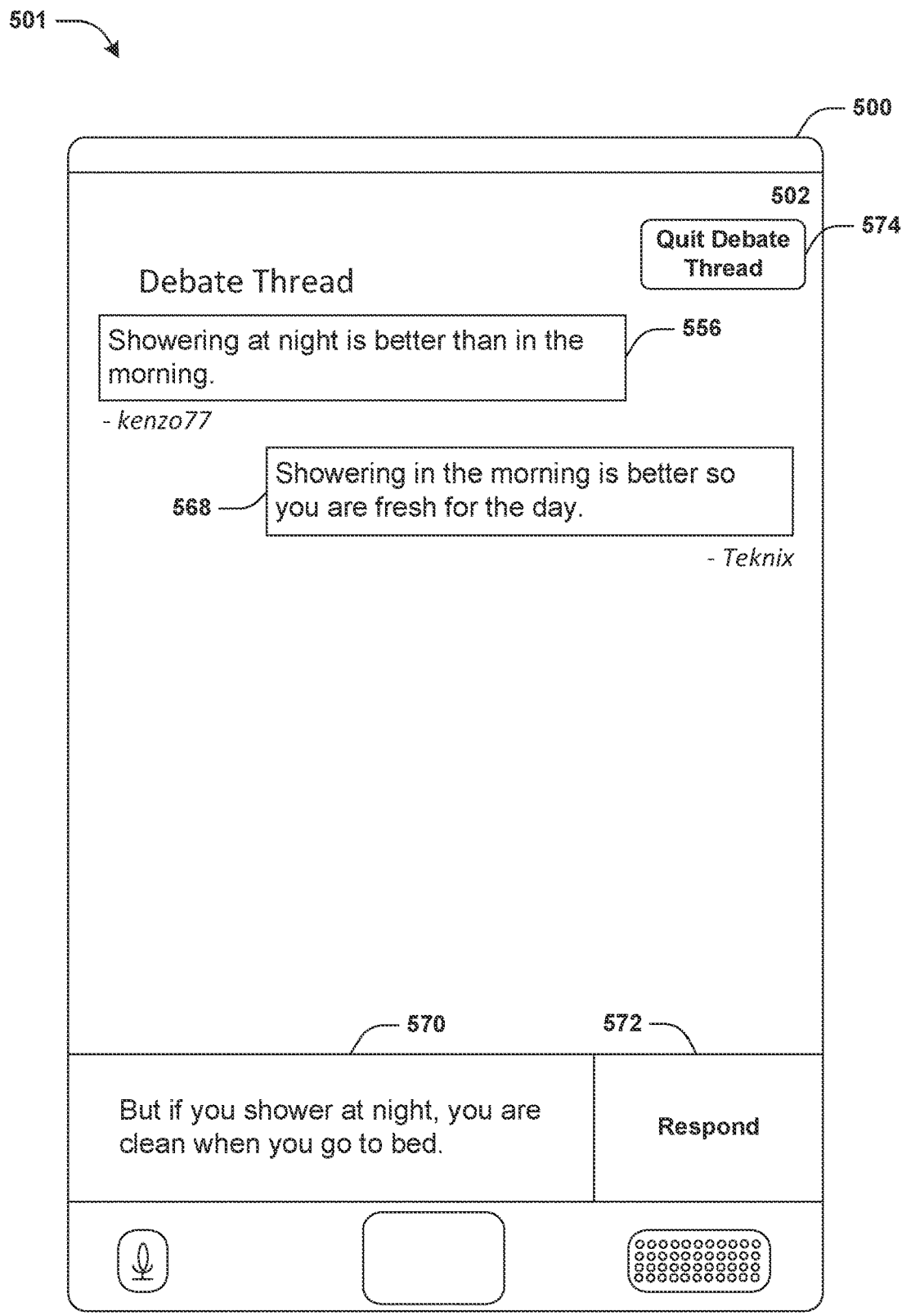
FIG. 5G is a component block diagram illustrating an example system for facilitating debate threads between users, where a first debate interface displays a first debate thread interface comprising a representation of a third debate thread.

FIG. 5G illustrates the first debate interface 502 displaying a first debate thread interface comprising a representation of the third debate thread. For example, the representation of the third debate thread may comprise representations of posts that are included in the third debate thread. In an example in which the first response post (shown with reference number 568) is included in the third debate thread, the representation of the third debate thread may comprise a representation of the first starting argument post 556 and/or a representation of the first response post 568. Alternatively and/or additionally, the representation of the third debate thread may comprise indications of user accounts associated with posts of the third debate thread. For example, an indication of the first user account (e.g., the username of the first user account, such as "kenzo77" in FIG. 5G) may be displayed adjacent to and/or underlying the representation of the first starting argument post 556. Alternatively and/or additionally, an indication of the second user account (e.g., the username of the second user account, such as "Teknix" in FIG. 5G) may be displayed adjacent to and/or underlying the representation of the first response post 568. In some examples, the first debate thread interface of the first debate interface 502 may comprise a quit debate thread selectable input 574 for quitting the third debate thread.

In some examples, the debate system may enable the first user account and the second user account to submit response posts for inclusion in the third debate thread. In some examples, when a response post by the first user account is included in the third debate thread, the debate system may not allow the first user account to submit additional response posts for inclusion in the third debate thread until a response post by the second user account is submitted to the debate system and/or included in the third debate thread. Alternatively and/or additionally, when a response post by the second user account is included in the third debate thread, the debate system may not allow the second user account to submit additional response posts for inclusion in the third debate thread until a response post by the first user account is submitted to the debate system and/or included in the third debate thread.

In some examples, a first submission status of the first user account and/or a second submission status of the second user account may be determined. The first submission status may correspond to whether or not the first user account is allowed to submit a response post for inclusion in the third debate thread. For example, when the first submission status is active, the debate system may allow submission of a response post by the first user account for inclusion in the third debate thread (e.g., when the first submission status is active, the first debate interface 502 may enable submission of a response post for inclusion in the third debate thread). Alternatively and/or additionally, when the first submission status is inactive, the debate system may not allow submission of a response post by the first user account for inclusion in the third debate thread (e.g., when the first submission status is inactive, the first debate interface 502 may disable submission of a response post for inclusion in the third debate thread).

The second submission status may correspond to whether or not the second user account is allowed to submit a response post for inclusion in the third debate thread. For example, when the second submission status is active, the debate system may allow submission of a response post by the second user account for inclusion in the third debate thread (e.g., when the second submission status is active, the second debate interface 554 may enable submission of a response post for inclusion in the third debate thread). Alternatively and/or additionally, when the second submission status is inactive, the debate system may not allow submission of a response post by the second user account for inclusion in the third debate thread (e.g., when the second submission status is inactive, the second debate interface 554 may disable submission of a response post for inclusion in the third debate thread).

In some examples, at a first time, the first submission status of the first user account may be set to active based upon a determination that a most recent submission of a post for inclusion in the first debate thread is by the second user account. At a second time different than the first time, the second submission status of the second user account may be set to active based upon a determination that a most recent submission of a post for inclusion in the first debate thread is by the first user account. The second submission status may be inactive when the first submission status is active. Alternatively and/or additionally, the first submission status may be inactive when the second submission status is active. For example, the first submission status and the second submission status may not both be active at the same time (so that merely one user account is able to submit a post for inclusion in the third debate thread at a time, for example).

In some examples, in response to including the first response post 568 in the third debate thread (and/or in response to receiving the first response post 568 from the second client device 550), the first submission status associated with the first user account may be set to active and/or the second submission status associated with the second user account may be set to inactive. At 410, when the first submission status of the first user account is active, the first debate interface 502 may enable submission of a response post for inclusion in the third debate thread. For example, the first submission status of the first user account may be active after the first response post 568 is received from the second client device 550. In an example, the first debate interface 502 may enable submission of a response post by displaying a response post submission interface (e.g., an input text field 570 and/or a selectable input 572 shown in FIG. 5G) via the first debate interface 502 and/or by enabling a response post to be submitted to the debate system using the response post submission interface.

In some examples, a second response post (e.g., "But if you shower at night, you are clean when you go to bed.") may be entered into the input text field 570 (of the response post submission interface shown in FIG. 5G). At 412, the second response post may be received from the first client device 500. For example, the second response post may be received (by the debate system, for example) in response to a selection of the selectable input 570 (e.g., a "respond" selectable input for posting a response to the first response post 568). The second response post may correspond to a response to the first response post 568. The second response post may be received when the first submission status of the first user account is active.

At 414, in response to receiving the second response post from the first client device 500, the second response post may be included in the third debate thread. In some examples, in response to receiving the second response post from the first client device 500, the second response post may be analyzed to determine whether or not the second response post meets the one or more first conditions. The second response post may be included in the third debate thread based upon a determination that the second response post meets the one or more first conditions. Alternatively and/or additionally, in response to including the second response post in the third debate thread (and/or in response to receiving the second response post and/or determining that the second response post meets the one or more first conditions), the first submission status of the first user account may be set to inactive and/or the second submission status of the second user account may be set to active.

In some examples, the second response post may not be included in the third debate thread based upon a determination that the second response post does not meet a condition of the one or more first conditions. Alternatively and/or additionally, one or more second operations may be performed in response to a determination that the second response post does not meet a condition of the one or more first conditions. In some examples, the one or more second operations may comprise storing an indication that the second response post violates a code of conduct of the debate system. Alternatively and/or additionally, the one or more second operations may comprise transmitting a message (e.g., a notification, such as at least one of an email, an instant message, etc.) to a client device (e.g., the first client device 500) associated with the first user account, wherein the message is indicative of the second response post violating the code of conduct of the debate system. Alternatively and/or additionally, the one or more second operations may comprise providing an opportunity for the first user account to provide a response post (that meets the one or more first conditions, for example) for inclusion in the third debate thread. For example, the first debate interface 502 may display an input text field (e.g., the input text field 570) and/or a selectable input (e.g., the selectable input 572) such that the first user associated with the first user account may submit a replacement response post (e.g., a replacement of the second response post) for inclusion in the third debate thread. In some examples, in response to receiving the replacement response post, the replacement response post may be analyzed to determine whether or not the replacement response post meets the one or more first conditions. In some examples, in response to a determination that the replacement response post meets the one or more first conditions, the replacement response post may be included in the third debate thread. In an example, information comprising at least one of the replacement response post, an indication of the first user account associated with the replacement response post (e.g., the indication of the first user account may comprise a username of the second user account), an indication of a time at which the replacement response post is received, etc. may be stored in the debate thread database (e.g., the information may be included in the first set of debate thread information associated with the third debate thread). Alternatively and/or additionally, in response to including the replacement response post in the third debate thread (and/or in response to receiving the replacement response post and/or determining that the replacement response post meets the one or more first conditions), the first submission status of the first user account may be set to inactive and/or the second submission status of the second user account may be set to active.

In some examples, in response to a determination that the replacement response post does not meet a condition of the one or more first conditions, the replacement response post may not be included in the third debate thread. Alternatively and/or additionally, in response to a determination that the replacement response post does not meet a condition of the one or more first conditions, at least some of the one or more second operations may be performed.

Alternatively and/or additionally, in response to a determination that the replacement response post does not meet a condition of the one or more first conditions, the replacement response post may not be included in the third debate thread and the first user account may not be provided with another opportunity to submit a response post for inclusion in the third debate thread (e.g., by submitting the replacement response post that does not meet a condition of the one or more first conditions, the first user account may lose an opportunity to post a response to the first response post 568 in the third debate thread). For example, in response to a determination that the replacement response post does not meet a condition of the one or more first conditions, the replacement response post may not be included in the third debate thread, the first submission status of the first user account may be set to inactive, and the second submission status of the second user account may be set to active. By setting the first submission status to inactive and setting the second submission status to active, the second user account may be allowed to submit a response post for inclusion in the third debate thread instead of the first user account, and thus the third debate thread may comprise multiple successive response posts by the second user account without a response post by the first user account between the multiple successive response posts (e.g., the debate system may allow the second user account to submit multiple response posts in succession until the first user account submits a response post that meets the one or more conditions and/or the third debate thread is labeled as complete). Accordingly, in response to a determination that the second response post submitted by the first user account does not meet a condition of the one or more first conditions, the first user account may be given an opportunity to submit a post (e.g., the replacement response post) that meets the one or more first conditions, wherein the first user may lose an opportunity to post a response to the first response post 568 in the third debate thread if the post (e.g., the replacement response post) does not meet the one or more first conditions.

Alternatively and/or additionally, embodiments are contemplated in which in in response to a determination that the second response post does not meet a condition of the one or more first conditions, the first submission status may be set to inactive and/or the second submission status may be set to active (e.g., the first user account may not be given an opportunity to submit the replacement response post if the second response post does not meet a condition of the one or more first conditions).

Figure 5H:
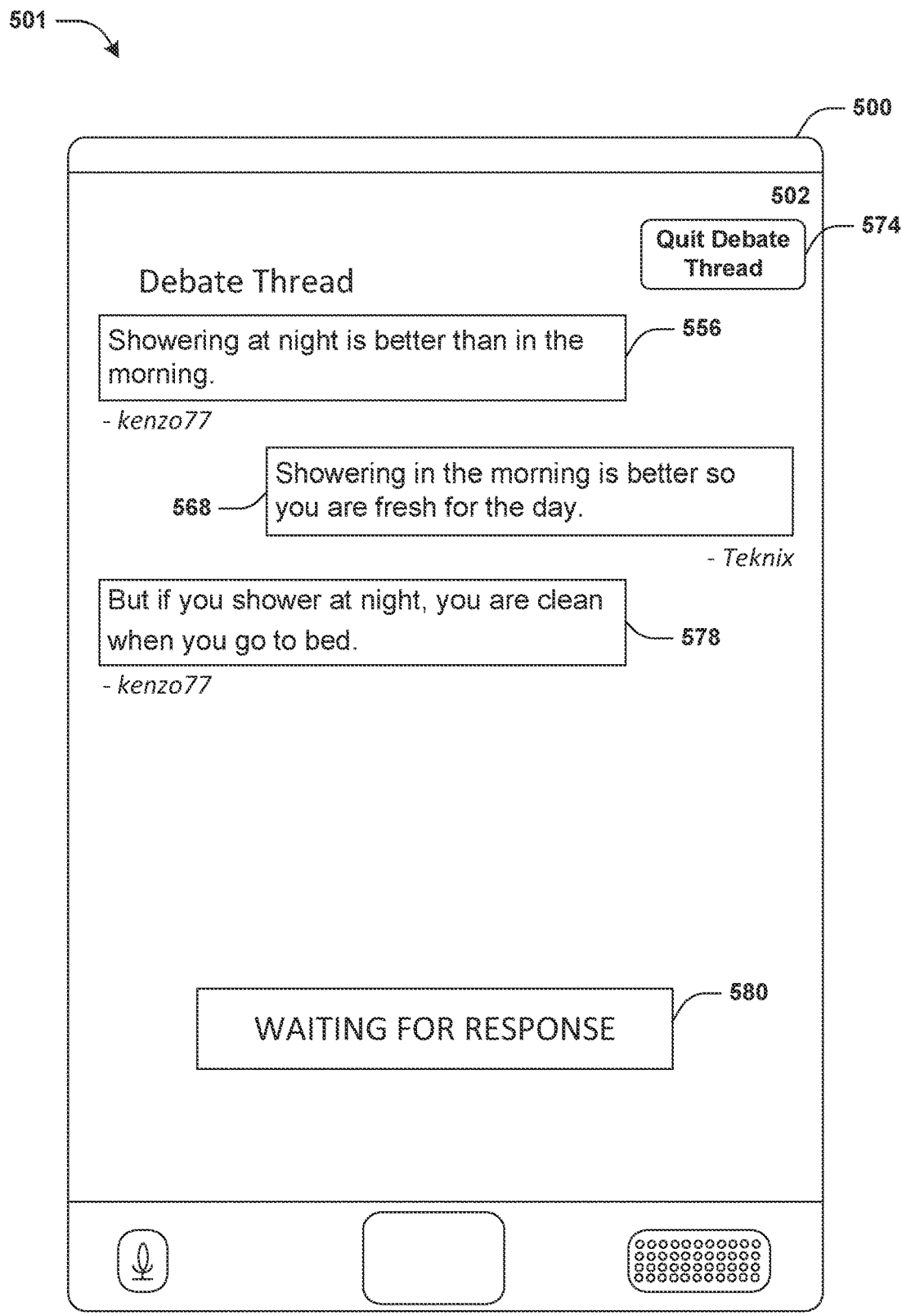
FIG. 5H is a component block diagram illustrating an example system for facilitating debate threads between users, where a first debate interface displays a first debate thread interface comprising a representation of a third debate thread.

FIG. 5H illustrates the first debate interface 502 displaying the first debate thread interface comprising a representation of the third debate thread. In an example in which the second response post (shown with reference number 578) is included in the third debate thread, the representation of the third debate thread may comprise a representation of the first starting argument post 556, a representation of the first response post 568 and/or a representation of the second response post 578. In some examples, when the first submission status is inactive (such as in response to the second response post 578 being included in the third debate thread), the first debate interface 502 may disable submission of a response post for inclusion in the third debate thread. Alternatively and/or additionally, when the first submission status is inactive, the first debate thread interface associated with the third debate thread may display an indication 580 that the first submission status of the first user account is inactive.

Figure 5I:
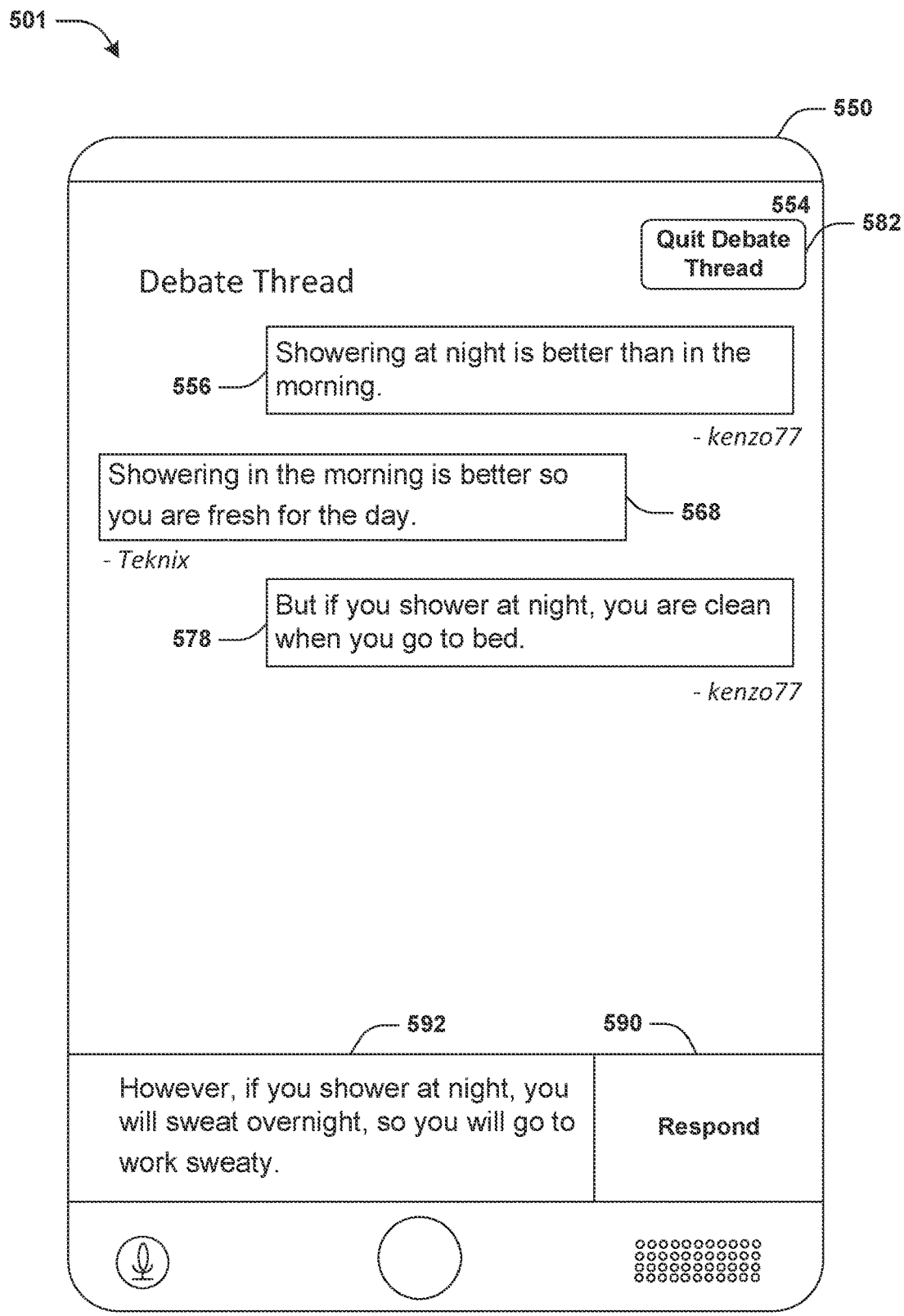
FIG. 5I is a component block diagram illustrating an example system for facilitating debate threads between users, where a second debate interface displays a second debate thread interface comprising a representation of a third debate thread.

FIG. 5I illustrates the second debate interface 554 displaying a second debate thread interface comprising a representation of the third debate thread. For example, the representation of the third debate thread may comprise representations of posts that are included in the third debate thread (e.g., the posts may comprise the first starting argument post 556, the first response post 568 and/or the second response post 578). In some examples, the second debate thread interface of the second debate interface 554 may comprise a quit debate thread selectable input 582 for quitting the third debate thread.

In some examples, in response to including the second response post 578 in the third debate thread (and/or in response to receiving the second response post 578 from the first client device 500), the first submission status associated with the first user account may be set to inactive and/or the second submission status associated with the second user account may be set to active. At 416, when the second submission status of the second user account is active, the second debate interface 554 may enable submission of a response post for inclusion in the third debate thread. For example, the second submission status of the second user account may be active after the second response post 578 is received from the first client device 500. In an example, the second debate interface 554 may enable submission of a response post by displaying a response post submission interface (e.g., an input text field 592 and/or a selectable input 590 shown in FIG. 5I) via the second debate interface 554 and/or by enabling a response post to be submitted to the debate system using the response post submission interface.

In some examples, a third response post (e.g., "However, if you shower at night, you will sweat overnight, so you will go to work sweaty.") may be entered into the input text field 592 (of the response post submission interface shown in FIG. 5I). At 418, the third response post may be received from the second client device 550. For example, the third response post may be received (by the debate system, for example) in response to a selection of the selectable input 590 (e.g., a "respond" selectable input for posting a response to the second response post 578). The third response post may correspond to a response to the second response post 578. The third response post may be received when the second submission status of the second user account is active.

At 420, in response to receiving the third response post from the second client device 550, the third response post may be included in the third debate thread. In some examples, in response to receiving the third response post from the second client device 550, the third response post may be analyzed to determine whether or not the third response post meets the one or more first conditions. The third response post may be included in the third debate thread based upon a determination that the third response post meets the one or more first conditions. Alternatively and/or additionally, in response to including the third response post in the third debate thread (and/or in response to receiving the third response post and/or determining that the third response post meets the one or more first conditions), the first submission status of the first user account may be set to active and/or the second submission status of the second user account may be set to inactive.

In some examples, the third response post may not be included in the third debate thread based upon a determination that the third response post does not meet a condition of the one or more first conditions. Alternatively and/or additionally, one or more third operations may be performed in response to a determination that the third response post does not meet a condition of the one or more first conditions. In some examples, the one or more third operations may comprise storing an indication that the third response post violates a code of conduct of the debate system. Alternatively and/or additionally, the one or more third operations may comprise transmitting a message (e.g., a notification, such as at least one of an email, an instant message, etc.) to a client device (e.g., the second client device 550) associated with the second user account, wherein the message is indicative of the third response post violating the code of conduct of the debate system. Alternatively and/or additionally, the one or more third operations may comprise providing an opportunity for the second user account to provide a response post (that meets the one or more first conditions, for example) for inclusion in the third debate thread. For example, the second debate interface 554 may display an input text field (e.g., the input text field 592) and/or a selectable input (e.g., the selectable input 590) such that the second user associated with the second user account may submit a replacement response post (e.g., a replacement of the third response post) for inclusion in the third debate thread. In some examples, in response to receiving the replacement response post, the replacement response post may be analyzed to determine whether or not the replacement response post meets the one or more first conditions. In some examples, in response to a determination that the replacement response post meets the one or more first conditions, the replacement response post may be included in the third debate thread. In an example, information comprising at least one of the replacement response post, an indication of the second user account associated with the replacement response post (e.g., the username of the second user account), an indication of a time at which the replacement response post is received, etc. may be stored in the debate thread database (e.g., the information may be included in the first set of debate thread information associated with the third debate thread). Alternatively and/or additionally, in response to including the replacement response post in the third debate thread (and/or in response to receiving the replacement response post and/or determining that the replacement response post meets the one or more first conditions), the first submission status of the first user account may be set to active and/or the second submission status of the second user account may be set to inactive. In some examples, in response to a determination that the replacement response post does not meet a condition of the one or more first conditions, the replacement response post may not be included in the third debate thread. Alternatively and/or additionally, in response to a determination that the replacement response post does not meet a condition of the one or more first conditions, at least some of the one or more third operations may be performed. Alternatively and/or additionally, in response to a determination that the replacement response post does not meet a condition of the one or more first conditions, the replacement response post may not be included in the third debate thread and the second user account may not be provided with another opportunity to submit a response post for inclusion in the third debate thread (e.g., by submitting the replacement response post that does not meet a condition of the one or more first conditions, the second user account may lose an opportunity to post a response to the second response post 578 in the third debate thread). For example, in response to a determination that the replacement response post does not meet a condition of the one or more first conditions, the replacement response post may not be included in the third debate thread, the first submission status of the first user account may be set to active, and the second submission status of the second user account may be set to inactive.

Alternatively and/or additionally, embodiments are contemplated in which in response to a determination that the third response post does not meet a condition of the one or more first conditions, the second submission status may be set to inactive and/or the first submission status may be set to active (e.g., the second user account may not be given an opportunity to submit the replacement response post if the third response post does not meet a condition of the one or more first conditions).

Figure 5J:
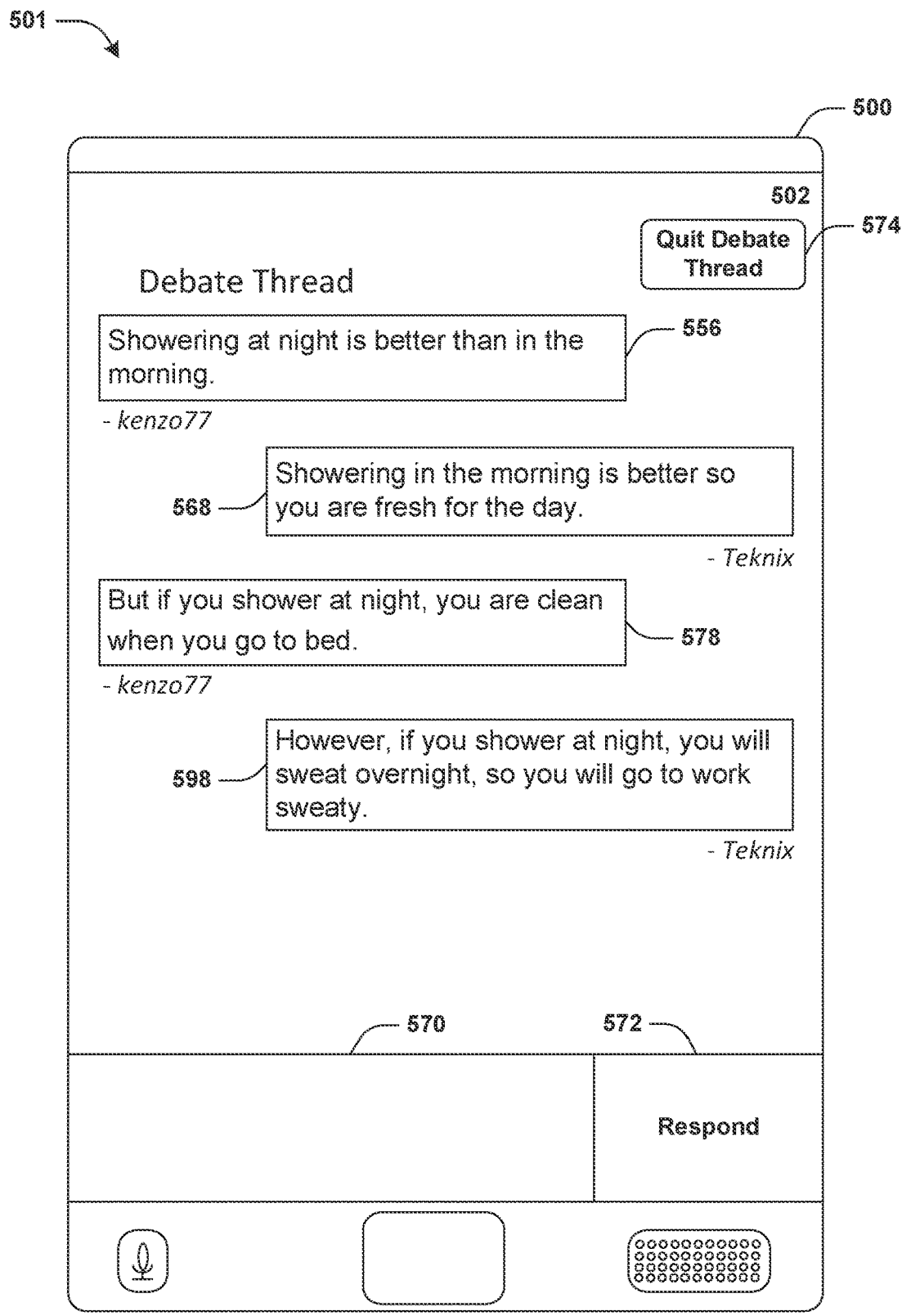
FIG. 5J is a component block diagram illustrating an example system for facilitating debate threads between users, where a first debate interface displays a first debate thread interface comprising a representation of a third debate thread.

FIG. 5J illustrates the first debate interface 502 displaying the first debate thread interface comprising a representation of the third debate thread. For example, the representation of the third debate thread may comprise representations of posts that are included in the third debate thread (e.g., the posts may comprise the first starting argument post 556, the first response post 568, the second response post 578 and/or the third response post (shown with reference number 598)). In some examples, when the first submission status is active, the first debate interface 502 may enable submission of a response post for inclusion in the third debate thread. For example, the first submission status of the first user account may be active after the third response post 598 is received from the second client device 550. In an example, the first debate interface 502 may enable submission of a response post by displaying the response post submission interface (e.g., the input text field 570 and/or the selectable input 572 shown in FIG. 5I) via the first debate interface 502 and/or by enabling a response post to be submitted to the debate system using the response post submission interface.

At 422, the third debate thread may be labeled as complete in response to a determination that a seventh condition is met. In some examples, the seventh condition is a condition that a participant of the third debate thread (e.g., a user account of the first user account and the second user account) quits the third debate thread, a participant of the third debate thread abandons the third debate thread, and/or a participant of the third debate thread submits a threshold quantity of prohibited posts for inclusion in the third debate thread. A prohibited post may correspond to a post that is determined to not meet a condition of the one or more first conditions. For example, the seventh condition may be determined to be met based upon a determination that a participant of the third debate thread (e.g., a user account of the first user account and the second user account) quits the third debate thread, a determination that a participant of the third debate thread abandons the third debate thread and/or a determination that a quantity of prohibited posts (e.g., response posts that do not meet the one or more first conditions) submitted by a participant of the third debate thread for inclusion in the third debate thread meets the threshold quantity of prohibited posts.

In an example, the third debate thread may be labeled as complete in response to a user account (e.g., a participant of the third debate thread, such as the first user account or the second user account) quitting the third debate thread. For example, a request to quit the third debate thread may be received from a client device associated with the user account. A plurality of selectable inputs associated with a plurality of quitting statements may be displayed via the client device (e.g., the plurality of selectable inputs may be displayed in response to receiving the request to quit the third debate thread). In an example, the user account may be considered to have quit the third debate thread and/or the third debate thread may be labeled as complete in response to a selection of a selectable input of the plurality of selectable inputs.

Figure 5K:
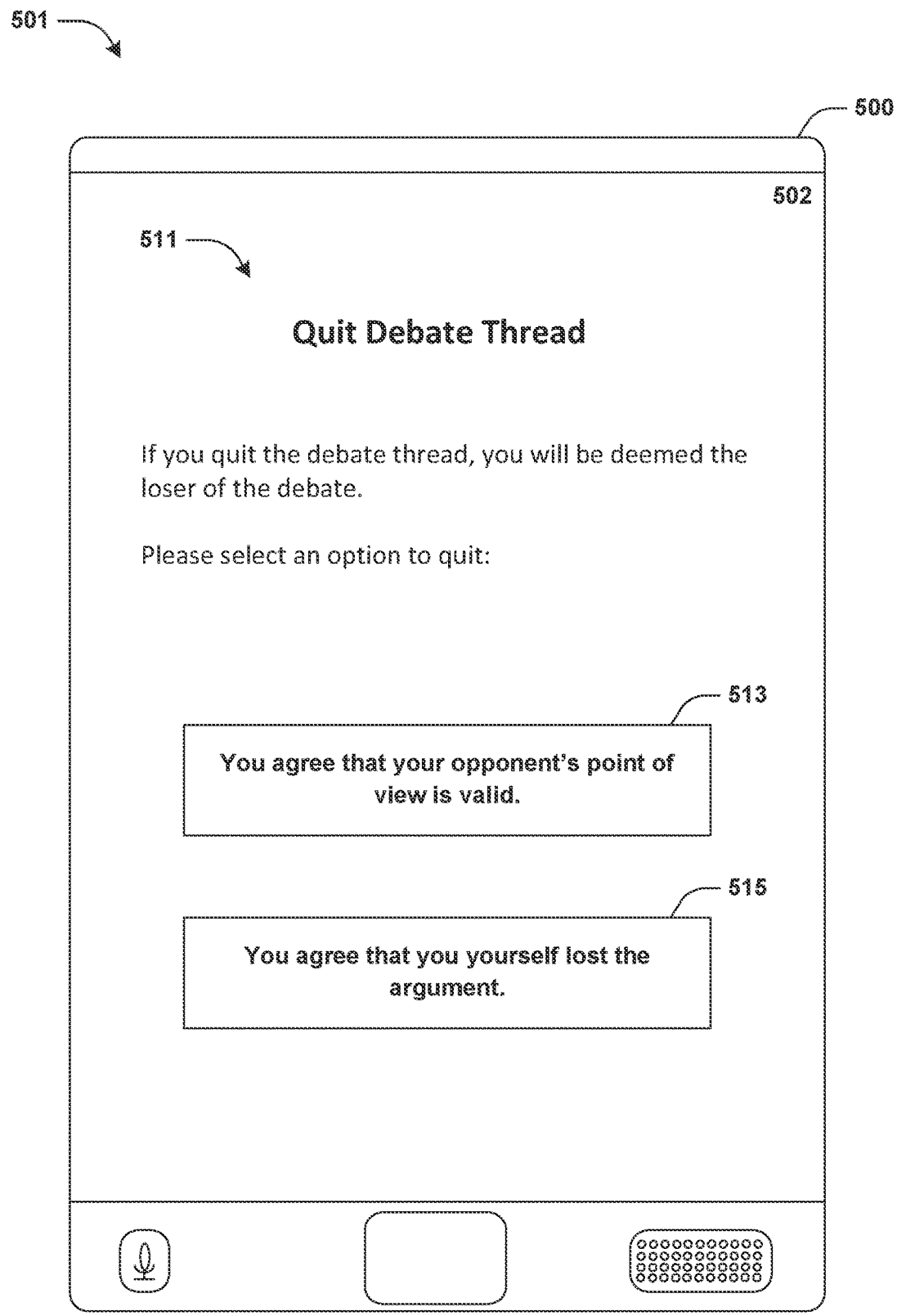
FIG. 5K is a component block diagram illustrating an example system for facilitating debate threads between users, where a first debate interface displays a quit debate thread interface.

In an example, a first request to quit the third debate thread may be received from the first client device 500. For example, the first request to quit the third debate thread may be received (by the debate system, for example) in response to a selection of the quit debate thread selectable input 574 (shown in FIGS. 5G and 5J). In some examples, in response to receiving the first request to quit the third debate thread, a quit debate thread interface may be displayed via the first debate interface 502. FIG. 5K illustrates the first debate interface 502 displaying the quit debate thread interface (shown with reference number 511). The quit debate thread interface 511 may comprise a first plurality of selectable inputs associated with a first plurality of quitting statements. The first plurality of selectable inputs may comprise a selectable input 513 associated with a first quitting statement of the first plurality of quitting statements (e.g., the first quitting statement may be a statement that the first user agrees that a point of view of an opponent, such as the second user account, is valid). Alternatively and/or additionally, the first plurality of selectable inputs may comprise a selectable input 515 associated with a second quitting statement of the first plurality of quitting statements (e.g., the second quitting statement may be a statement that the first user agrees that the first user lost the debate of the third debate thread). The quit debate thread interface 511 may comprise an indication that if the first user quits the third debate thread, the first user account will be considered the loser of the third debate thread. Alternatively and/or additionally, the quit debate thread interface 511 may comprise instructions to select a selectable input of the first plurality of selectable inputs to quit the third debate thread. The first user account may be considered to have quit the third debate thread based upon a selection of a selectable input of the first plurality of selectable inputs. Alternatively and/or additionally, information, comprising an indication that the first user account lost the third debate thread and/or an indication of a quitting statement associated with the selected selectable input of the first plurality of selectable inputs, may be included in the third debate thread and/or stored in the debate thread database (e.g., the information may be included in the first set of debate thread information associated with the third debate thread). Alternatively and/or additionally, the first user account may be considered to be a loser of the third debate thread based upon a selection of a selectable input of the first plurality of selectable inputs. Alternatively and/or additionally, the seventh condition may be determined to be met based upon a selection of a selectable input of the first plurality of selectable inputs.

In some examples, the third debate thread may be labeled as complete in response to the third debate thread being abandoned by a user account (e.g., a participant of the third debate thread, such as the first user account or the second user account). For example, the third debate thread may be considered to be abandoned (and/or the third debate thread may be labeled as complete) based upon no posting activity having been performed on the third debate thread by a participant of the third debate thread for a threshold duration of time (e.g., no participant of the third debate thread submitted a response post on the third debate thread for at least the threshold duration of time). In an example, the threshold duration of time may be 24 hours, 72 hours, a week, or other duration of time. In some examples, the user account having a submission status that is active when the third debate thread is abandoned may be considered to be the user account that abandoned the third debate thread, wherein the user account that abandoned the third debate thread may be considered to be a loser of the third debate thread. Alternatively and/or additionally, if the third debate thread is abandoned by a user account of the third debate thread, all participants of the third debate thread may be considered to be losers of the third debate thread (e.g., the first user account and the second user account may be considered to be losers of the third debate thread based upon a determination that the first user account abandoned the third debate thread).

In an example, at a first time, a submission status of a user account (e.g., a participant of the third debate thread, such as the first user account or the second user account) may be set to active. It may be determined that the third debate thread is abandoned by the user account based upon the threshold duration of time having passed since the first time without a response post being included in the third debate thread (e.g., the user account does not post any response post in the third debate thread within the threshold duration of time after the first time).

In an example, the first submission status of the first user account may be set to active at a first time (e.g., the first submission status may be set to active in response to including the third response post 598 in the third debate thread). It may be determined that the third debate thread is abandoned by the first user account based upon the threshold duration of time having passed since the first time without a response post being included in the third debate thread (e.g., the first user account does not post any response post in the third debate thread within the threshold duration of time after the first time). In some examples, information, comprising an indication that the first user account lost the third debate thread and/or an indication that the first user account abandoned the third debate thread, may be included in the third debate thread and/or stored in the debate thread database (e.g., the information may be included in the first set of debate thread information associated with the third debate thread). Alternatively and/or additionally, the first user account may be considered to be a loser of the third debate thread based upon the determination that the first user account abandoned the third debate thread. Alternatively and/or additionally, the seventh condition may be determined to be met based upon the determination that the first user account abandoned the third debate thread.

In an example, the third debate thread may be labeled as complete in response to prohibited posts (e.g., response posts that do not meet the one or more first conditions) submitted by a user account (e.g., a participant of the third debate thread, such as the first user account or the second user account) for inclusion in the third debate thread amounting to the threshold quantity of prohibited posts. In some examples, information, comprising an indication that the user account lost the third debate thread and/or an indication that the user account violated the code of conduct of the debate system, may be included in the third debate thread and/or stored in the debate thread database (e.g., the information may be included in the first set of debate thread information associated with the third debate thread). Alternatively and/or additionally, the user account may be considered to be a loser of the third debate thread based upon the determination that the prohibited posts submitted by the user account for inclusion in the third debate thread amounts to the threshold quantity of prohibited posts. Alternatively and/or additionally, the seventh condition may be determined to be met based upon the determination that the prohibited posts submitted by the user account for inclusion in the third debate thread amounts to the threshold quantity of prohibited posts.

In some examples, labeling the third debate thread as complete (in response to determining that the seventh condition is met, for example) may comprise setting the status of the third debate thread to closed (e.g., the status of the third debate thread may be changed from active to closed). Alternatively and/or additionally, labeling the third debate thread as complete may comprise storing an indication that the third debate thread is complete in the debate thread database (e.g., the indication that the third debate thread is complete may be included in the first set of debate thread information associated with the third debate thread). In an example in which it is determined that the third debate thread is abandoned by a participant of the third debate thread (e.g., the first user account or the second user account), labeling the third debate thread as complete may comprise labeling the third debate thread as an abandoned thread (e.g., an indication that the third debate thread is an abandoned thread may be stored in the debate thread database, such as included in the first set of debate thread information associated with the third debate thread).

Figure 5L:
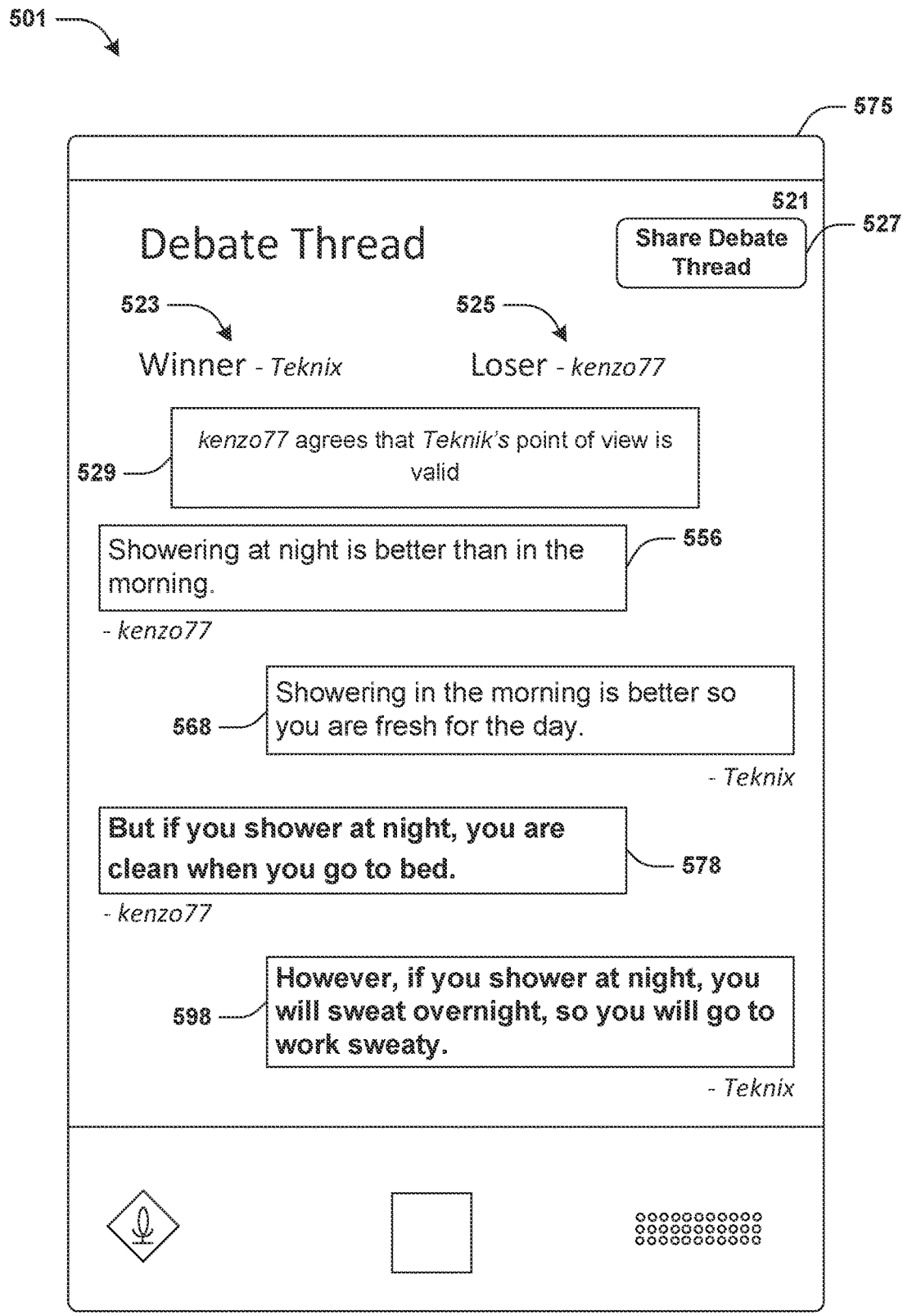
FIG. 5L is a component block diagram illustrating an example system for facilitating debate threads between users, where a representation of a third debate thread is displayed via a third debate interface on a third client device.

In some examples, when the status of the third debate thread is closed, the third debate thread may be accessed and/or viewed by non-participants of the third debate thread (e.g., user accounts other than the first user account and/or the second user account) and/or guest users (that are not logged into a user account of the debate system). FIG. 5L illustrates a representation of the third debate thread being displayed via a third debate interface 521 on a third client device 575. For example, the third client device 575 may be associated with a third user account of the debate system (e.g., the third client device 575 may be logged into the third user account) and/or a guest user. In an example, the representation of the third debate thread may be displayed in response to receiving a request to view the third debate thread from the third client device 575. The request to view the third debate thread may be received in response to a selection of a debate thread item associated with the third debate thread (e.g., the debate thread item may be displayed via the third client device 575 and/or may comprise a link to view the third debate thread). Alternatively and/or additionally, the request to view the third debate thread may be received in response to a selection of a search result associated with the third debate thread (e.g., the search result may be displayed via the third client device 575 and/or may comprise a link to view the third debate thread).

In some examples, the representation of the third debate thread may comprise an indication 523 of a winner of the third debate thread. In the example shown in FIG. 5L, the indication 523 may indicate that the second user account (e.g., "Teknix") is the winner of the third debate thread. In an example, the second user account may be considered to be the winner of the third debate thread based upon a determination that the first user account is the loser of the third debate thread.

In some examples, the representation of the third debate thread may comprise an indication 525 of a loser of the third debate thread. In the example shown in FIG. 5L, the indication 525 may indicate that the first user account (e.g., "kenzo77") is the loser of the third debate thread. In an example, the first user account may be considered to be the loser of the third debate thread based upon a determination that the first user account quit the third debate thread, a determination that the first user account abandoned the third debate thread and/or a determination that prohibited posts submitted by the first user account for inclusion in the third debate thread amounts to the threshold quantity of prohibited posts.

In some examples, the representation of the third debate thread may comprise an indication 529 of a quitting statement associated with the loser of the third debate thread. In the example shown in FIG. 5L, the indication 529 may indicate that the first user account (e.g., "kenzo77") agrees that the opponent's point of view is valid. The indication 529 may be indicative of (and/or based upon) a quitting statement, of the first plurality of quitting statements, that is selected using the first client device 500 via the first plurality of selectable inputs (shown in FIG. 5K).

In some examples, the representation of the third debate thread may comprise an indication (not shown) that the third debate thread is an abandoned thread and/or may comprise an indication of a user account that abandoned the third debate thread. In an example in which the first user account abandoned the third debate thread, the representation of the third debate thread may comprise an indication comprising "The debate thread was abandoned by kenzo77".

In some examples, the representation of the third debate thread may comprise representations of posts in the third debate thread (e.g., representations of all posts in the third debate thread), such as a representation of the first starting argument post 556, a representation of the first response post 568, a representation of the second response post 578 and/or a representation of the third response post 598. Although FIG. 5L shows the third debate thread as comprising four posts, it may be appreciated that the third debate thread may comprise any number of posts. For example, response posts may be submitted and/or included in the third debate thread by participants of the third debate thread (e.g., the first user account and the second user account) until the third debate thread is labeled as complete.

In some examples, a plurality of quality scores associated with a plurality of posts of the third debate thread (e.g., the plurality of posts may comprise at least one of the first starting argument post 556, the first response post 568, the second response post 578, the third response post 598, etc.) may be determined. For example, a quality score (of the plurality of quality scores) associated with a post (of the plurality of posts) may be determined based upon a coherency score associated with the post and/or a relevance score associated with the post. For example, one or more operations (e.g., mathematical operations) may be performed using the coherency score, the relevance score and/or one or more other values to determine the quality score associated with the post. The coherency score may be indicative of a level of coherency of the post and/or may be determined using the first NLP model, such as using one or more of the techniques provided herein with respect to determining the first coherency score. The relevance score may be indicative of a level of relevance of the post to the third debate thread and/or may be determined using the second NLP model, such as using one or more of the techniques provided herein with respect to determining the first relevance score. In some examples, the representation of the third debate thread (displayed via the third debate interface 521) may comprise indications of quality scores of the plurality of quality scores. For example, an indication (not shown) of a quality score associated with a post of the plurality of posts may be displayed adjacent to the post. Alternatively and/or additionally, quality classifications of the plurality of posts may be determined based upon the plurality of quality scores. For example, a quality classification of a post of the plurality of posts may be indicative of the post being a high quality post or a low quality post. In an example, a quality classification of a post may be indicative of the post being a high quality post based upon a quality score associated with the post being higher than a threshold quality score. Alternatively and/or additionally, a quality classification of a post may be indicative of the post being a low quality post based upon a quality score associated with the post being lower than the threshold quality score. In some examples, the representation of the third debate thread (displayed via the third debate interface 521) may comprise indications of the quality classifications of the plurality of posts. Alternatively and/or additionally, representations of the plurality of posts may be generated based upon the plurality of quality scores and/or the quality classifications. In an example, a representation of a high quality post (e.g., a post associated with a quality score that is higher than the threshold quality score) may be emphasized over a representation of a low quality post (e.g., a post associated with a quality score that is higher than the threshold quality score). Alternatively and/or additionally, representations of high quality posts of the plurality of posts may be bolded, highlighted, a color (e.g., a color different than a color of representations of low quality posts), etc. to distinguish the high quality posts from low quality posts of the plurality of posts. For example, in FIG. 5L, the representation of the second response post 578 and/or the representation of the third response post 598 may comprise bolded text to indicate that the second response post 578 and/or the third response post 598 are high quality posts of the plurality of posts.

In some examples, the third debate interface 521 may display a share debate thread selectable input 527 associated with the sharing function of the debate system. In an example, the share function of the debate system may be used to share the third debate thread via at least one of a messaging application, a social media application, a blog, etc. In an example, in response to a selection of the share debate thread selectable input 527, a link to the third debate thread may be copied to a clipboard of the third client device, wherein a user of the third client device may paste the link to an input text field (e.g., an input text field of a messaging application, a social media application, a blog, etc.). In an example, the link may comprise at least one of a web address of a web page comprising the third debate thread, a web address of an application (e.g., a debate platform application provided by the debate system, such as at least one of a mobile application, a web application, etc.).

Alternatively and/or additionally, in response to a selection of the share debate thread selectable input 527, a list of applications may be displayed via the third client device 575. The list of applications may correspond to applications (e.g., a messaging application, a social media application, a blog, etc.) installed on the third client device 575. One or more applications (with which a user of the third client device 575 wants to share the third debate thread with other users, for example) may be selected via the list of applications. In response to selecting an application of the list of applications, the third debate thread may be shared via the application. For example, in response to selecting a social media application of the list of applications, the social media application may submit a social media post, comprising a link to the third debate thread, to be posted on a social media platform.

It may be appreciated that the sharing function may be used to share the third debate thread when the status of the third debate thread is open, active and/or closed.

In some examples, when the status of the third debate thread is open, an invitation to join the third debate thread as a participant may be transmitted to one or more client devices. For example, the invitation to join the third debate thread may be transmitted in response to reception of a request to share the invitation to join the third debate thread from a client device (e.g., the first client device 500 or other client device). In an example, the invitation may comprise a link to the third debate thread and/or an indication of a user account that initiated the invitation.

In an example, a request to share an invitation to join the third debate thread may be received from the first client device 500 associated with the first user account. The request may be received (when the status of the third debate thread is open, for example) via the first debate interface 521. In response to receiving the request, an invitation to join the third debate thread may be generated. In an example, the invitation may comprise an indication of the first user account associated with the invitation and/or a link to the third debate thread (e.g., the invitation may comprise "kenzo77 invites you to join a debate thread at www.debateplatform.com/debate432"). The invitation to join the third debate thread may be shared using one or more of the techniques provided herein with respect to sharing the third debate thread using the sharing function.

In some examples, in response to a determination that an eighth condition is met, the first set of debate thread information associated with the third debate thread may be deleted from the debate thread database and/or the debate system may not provide access to the third debate thread to users of the debate system. In some examples, the eighth condition is a condition that one or more participants of the third debate thread (e.g., the first user account and/or the second user account) request that the third debate thread be removed from the debate system and/or no longer be accessible to users of the debate system. In an example, the eighth condition may be determined to be met based upon reception of a request to remove the third debate thread from a client device associated with the first user account, such as the first client device 500 (e.g., the request may be received via a selection of one or more selectable inputs displayed by the first debate interface 502).

Alternatively and/or additionally, the eighth condition may be a condition that all participants of the third debate thread (e.g., the first user account and the second user account) request that the third debate thread be removed from the debate system and/or no longer be accessible to users of the debate system. In an example, if a request to remove the third debate thread is received from a client device associated with the first user account (e.g., the first client device 500) but a request to remove the third debate thread is not received from a client device associated with the second user account (e.g., the second client device 550), the eighth condition may not be met since all participants of the third debate thread did not request the third debate thread be removed from the debate system.

In an example, in response to receiving a first request to remove the third debate thread from a client device associated with the first user account (e.g., the first client device 500), the debate system may transmit a notification (e.g., at least one of an email, an instant message, etc.) to a client device associated with the second user account (e.g., the second client device 550). For example, the notification may be displayed via the second debate interface 554. The notification may comprise an indication that the first user account requests removal of the third debate thread from the debate system. Alternatively and/or additionally, the notification may comprise a debate thread removal selectable input associated with requesting removal of the third debate thread from the debate system. In some examples, in response to a selection of the debate thread removal selectable input, a second request to remove the third debate thread associated with the second user account may be received by the debate system. Accordingly, the eighth condition may be determined to be met based upon reception of the first request associated with the first user account and the second request associated with the second user account. In response to the determination that the eighth condition is met, the first set of debate thread information associated with the third debate thread may be deleted from the debate thread database and/or the debate system may not provide access to the third debate thread to users of the debate system.

In some examples, user profiles of user accounts of the debate system may be generated. In some examples, a user profile of a user account of the debate system may be generated based upon at least one of user-input information associated with the user account, historical activity information associated with the user account, etc. In an example, a first user profile associated with the first user account may be generated.

Figure 5M:
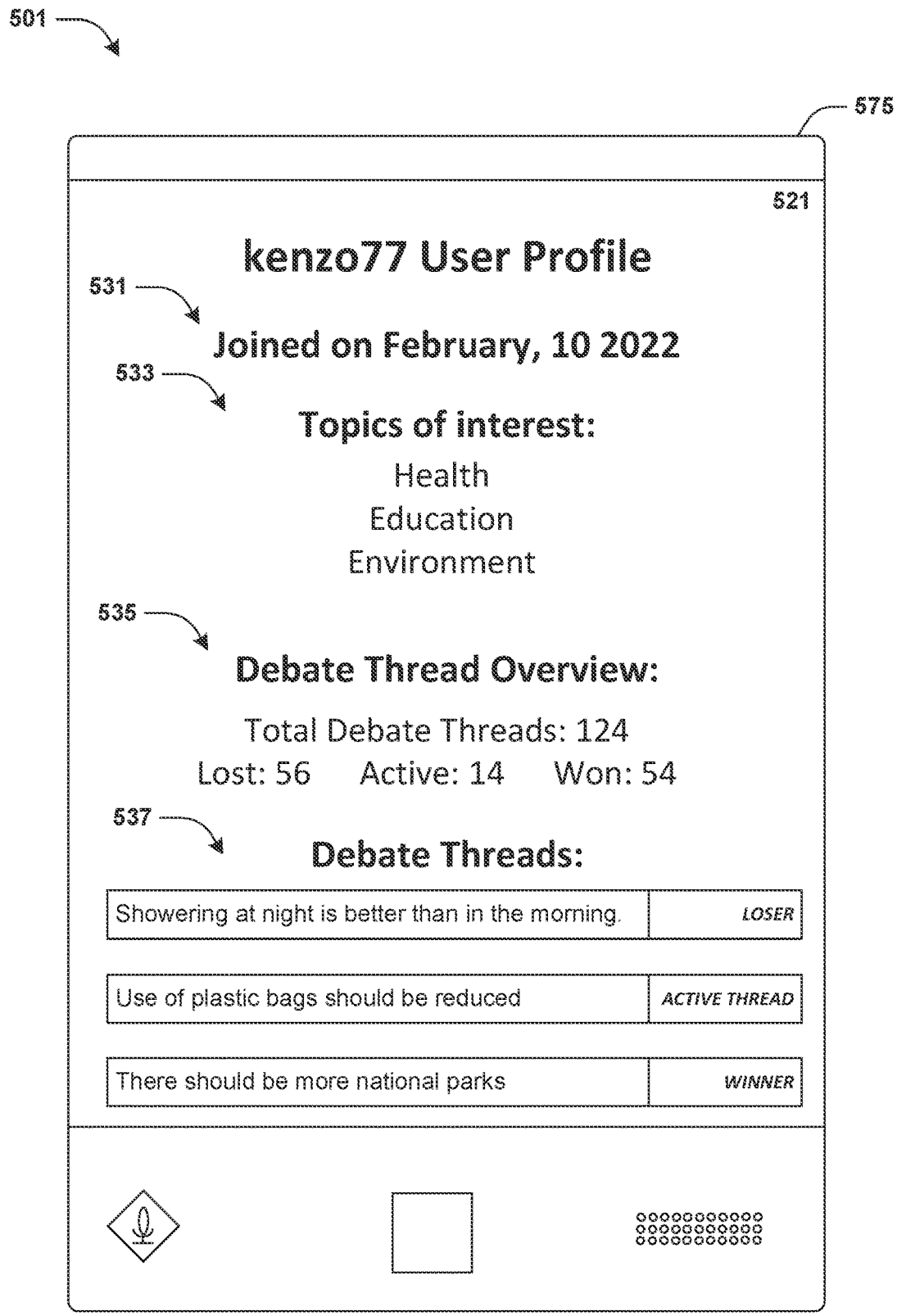
FIG. 5M is a component block diagram illustrating an example system for facilitating debate threads between users, where a representation of a first user profile is displayed via the third debate interface.

FIG. 5M illustrates a representation of the first user profile being displayed via the third debate interface 521. In an example, the representation of the first user profile may be displayed via the third debate interface 521 in response to a selection of an indication of the first user account (e.g., a username of the first user account) via the third debate interface 521. In some examples, the first user profile may comprise an indication 531 of a time (e.g., a date) at which the first user account was generated (e.g., a time the first user joined and/or signed up with the debate system).

Alternatively and/or additionally, the first user profile may comprise an indication 533 of one or more topics of interest of the first user account. For example, the one or more topics of interest may be based upon first user-input information. The first user-input information may be received via a profile interface comprising one or more selectable inputs and/or one or more input text fields for inputting information associated with the first user account (e.g., the first user-input information may comprise at least one of one or more topics of interest, one or more links to one or more social media accounts associated with the first user, etc.). Alternatively and/or additionally, the one or more topics of interest may be determined based upon the historical activity information associated with the first user account (such as using one or more of the techniques provided herein with respect to determining the one or more second topics). In some examples, the profile interface may be displayed via the first debate interface 502. In an example, the profile interface may be displayed via the sign up interface.

Alternatively and/or additionally, the first user profile may comprise an indication (not shown) of the one or more links to one or more social media accounts associated with the first user.

In some examples, one or more first types of information may not be included in the first user profile (e.g., the debate system may not allow the one or more first types of information to be included in the first user profile). For example, the one or more first types of information may comprise at least one of a political affiliation of the first user, a political party supported by the first user, where the first user stands on the political spectrum, etc.

In some examples, the first user profile may comprise an indication 535 of one or more metrics associated with debate threads in which the first user account is a participant. For example, the one or more metrics may comprise a quantity of debate threads (e.g., 124) in which the first user account is a participant, a quantity of debate threads in which the first user account is considered to be a loser (e.g., 56), a quantity of debate threads that currently have a status of active (e.g., 14) and/or a quantity of debate threads in which the first user account is considered to be a winner (e.g., 54).

In some examples, the first user profile may comprise a list of debate thread items 537 associated with debate threads in which the first user account is a participant. In an example, a debate thread item of the list of debate thread items 537 may comprise a link to view a debate thread associated with the debate thread item. In an example, in response to a selection of a debate thread item of the list of debate thread items 537, a representation of a debate thread associated with the debate thread item may be displayed via the third debate interface 521. In some examples, a debate thread item, that is associated with a debate thread in which the first user account is considered to be a loser, may comprise an indication (e.g., "LOSER") of the first user account being a loser of the debate thread. In some examples, a debate thread item, that is associated with a debate thread in which the first user account is considered to be a winner, may comprise an indication (e.g., "WINNER") of the first user account being a winner of the debate thread. In some examples, a debate thread item, that is associated with a debate thread that has a status of active, may comprise an indication (e.g., "ACTIVE THREAD") of the status of the debate thread being active.

In some examples, debate threads of the plurality of debate threads may be analyzed to generate a report. In an example, the report may be indicative of one or more trending topics (e.g., one or more popular topics among debate threads of the plurality of debate threads). Alternatively and/or additionally, the report may comprise a summary of arguments made in posts of debate threads associated with a topic (e.g., a topic of the one or more trending topics). Alternatively and/or additionally, the report may comprise a metrics associated with debate threads, such as at least one of a quantity of views of a debate thread, a quantity of shares of a debate thread, etc. In some examples, the report may be used for development of the debate system. Alternatively and/or additionally, the report may be indicative of insufficiently covered topics (e.g., topics that are determined to be insufficiently covered by debate threads of the plurality of debate threads, such as where the plurality of debate threads comprises less than a threshold quantity of debate threads associated with an insufficiently covered topic). In some examples, the report may be used for development of the debate system (e.g., the report may be transmitted to a client device associated with a development agent of the debate system). Alternatively and/or additionally, users of the debate system and/or the general public may be provided with access to the report (e.g., the report may be published and/or transmitted to client devices).

It may be appreciated that the disclosed subject matter may assist users (and/or devices associated with the users) in engaging in a debate thread. By not allowing non-participants of the debate thread to submit posts and/or reaction signals in the debate thread, the debate system may prevent the debate thread from being impeded by non-participants of the debate thread. Alternatively and/or additionally, by including posts in the debate thread that are determined to meet the one or more first conditions, the debate system may provide a safe and/or non-threatening environment for the users to argue opposing views with each other.

Implementation of at least some of the disclosed subject matter may lead to benefits including a reduction in screen space and/or an improved usability of a display (e.g., of the first client device 500, the second client device 550 and/or the third client device 575) (e.g., as a result of determining the plurality of quality scores associated with posts of the third debate thread, as a result of generating representations of posts of the third debate thread based upon the plurality of quality scores, such as where representations of high quality posts may be at least one of emphasized, bolded, highlighted, colored, etc. such that a user of the third client device 575 can more quickly and/or conveniently identify high quality posts and/or may more quickly and/or conveniently gain insights from the high quality posts without having to spend a large amount of time navigating through and consuming all posts of the third debate thread to identify the high quality posts).

Alternatively and/or additionally, implementation of at least some of the disclosed subject matter may lead to benefits including a reduction in screen space and/or an improved usability of a display (e.g., of the first client device 500, the second client device 550 and/or the third client device 575) (e.g., as a result of determining the plurality of debate thread scores associated with the plurality of debate threads based upon the historical activity information associated with the first user account, wherein a debate thread score of the plurality of debate thread scores may be based upon a likelihood of the first user being interested in a debate thread and/or a likelihood that the first user would select a debate thread item associated with the debate thread, as a result of selecting the second set of debate threads based upon the plurality of debate thread scores, as a result of generating the second list of debate thread items 554 based upon the second set of debate threads such that the second list of debate thread items 554 are associated with debate threads that the first user has an interest in and/or is likely to click, wherein the first user may not have to navigate throughout the internet to find debate threads that the first user has an interest in, etc.).

Alternatively and/or additionally, implementation of at least some of the disclosed subject matter may lead to benefits including providing an improved environment for engaging in debate threads between user accounts. For example, by automatically determining submission statuses of user accounts, automatically enforcing the maximum post length, and/or automatically controlling debate interfaces to enable and/or disable submission of posts based upon the submission statuses, users may more conveniently and/or engage in debates with each other without users submitting posts that are too long and/or when it is not their turn (e.g., without implementing one or more of the techniques provided herein, users may accidentally submit posts out of turn due to the complexity of engaging in debates without the debate system).

Alternatively and/or additionally, implementation of at least some of the disclosed subject matter may lead to benefits including less manual effort (e.g., as a result of generating and/or providing the first list of debate thread items 552 and/or the second list of debate thread items 554 automatically, wherein the first user does not need to read through debate threads throughout the internet to find debate threads that the user has an interest in).

In some examples, in response to the first submission status of the first user account changing from inactive (when the first user account is not allowed to submit a post for inclusion in the third debate thread, for example) to active (when the first user account is allowed to submit a post for inclusion in the third debate thread, for example), a notification (e.g., at least one of an email, an instant message, etc.) may be transmitted to one or more client devices associated with the first user account and/or may be displayed via a client device of the one or more client devices. The notification may comprise at least one of an indication that the first user account is allowed to submit a post for inclusion in the third debate thread, one or more representations of one or more posts in the third debate thread (e.g., the one or more posts may comprise a most recent post, submitted by the second user account, that is included in the third debate thread), a response post submission interface with which a response post may be submitted for inclusion in the third debate thread, a link to a page (e.g., a page of the debate platform application) comprising the response post submission interface with which a response post may be submitted for inclusion in the third debate thread, etc. It may be appreciated that transmitting the notification to the one or more client devices and/or displaying the notification via a client device the one or more client devices allows the first user to keep track of one or more debate threads (e.g., the third debate thread and/or one or more other debate threads) in which the first user account is a participant. For example, the first user may not be required to individually check each debate thread in which the first user account is a participant to see whether the first user account is allowed to submit a post. Rather, the first user may be notified of the change in the first submission status automatically. Alternatively and/or additionally, by providing the one or more representations of the one or more posts in the notification, the first user may more quickly and/or conveniently identify the one or more posts and/or develop a response based upon the one or more posts (e.g., a response to the most recent post, submitted by the second user account, that is included in the third debate thread). Alternatively and/or additionally, by providing the response post submission interface and/or the link to the page comprising the response post submission interface in the notification, the first user may more quickly and/or conveniently enter and/or submit a response post for inclusion in the third debate thread.

In some examples, in response to a selection of a debate thread item (e.g., a debate thread item of the first list of debate thread items 552 and/or the second list of debate thread items 554), a summary of a debate thread associated with the debate thread item may be displayed. In an example, a graphical object, comprising the summary, may be displayed via the first client device 500 in response to the selection of the debate thread item. In some examples, the graphical object may make up merely a portion of the first debate interface 502 and/or merely a portion of a display of the first client device 500. Alternatively and/or additionally, while the graphical object is displayed, in response to a selection (e.g., a click and/or a finger touch) of an area outside the graphical object (e.g., an area, of the first debate interface 502 and/or the display, that is offset from the graphical object), the graphical object may be closed and/or no longer displayed (e.g., at least a portion of a graphical user interface displayed prior to the selection of the debate thread item may be made visible by closing and/or no longer displaying the graphical object). In an example, the graphical object may comprise a selectable input associated with accessing the debate thread (e.g., in response to a selection of the selectable input, a representation of the debate thread, such as an entirety of the debate thread, may be displayed via the first debate interface 502, such as where the first client device 500 may be redirected to a page comprising the representation of the debate thread). In some examples, the summary may comprise a subset of posts of a plurality of posts of the debate thread. Alternatively and/or additionally, the summary may comprise posts, of the debate thread, that are determined to be high quality posts (e.g., posts associated with quality scores that exceed the threshold quality score). Accordingly, the first user may quickly and/or conveniently navigate through summaries of debate threads via a page comprising one or more lists of debate thread items displayed by the first debate interface 502 without redirecting from the page and/or closing the page.

In some examples, the first client device 500 is configured to display a menu listing one or more features (e.g., selectable features) of the debate system. The one or more features may comprise at least one of a debate feature, a messaging feature, a social media feed feature, etc. In an example, in response to a selection of the debate feature, the debate feature may provide one or more resources (e.g., data, an interface, etc.) for displaying and/or engaging in debate threads (such as using one or more of the techniques provided herein). In response to a selection of the messaging feature, the messaging feature may provide one or more resources (e.g., data, an interface, etc.) for displaying and/or facilitating messaging conversations (e.g., private messaging conversations and/or public messaging conversations) between users of the debate system (e.g., users of the debate system may send messages to each other using the messaging feature of the debate system). In response to a selection of the social media feed feature, the social media feed feature may provide one or more resources (e.g., data, an interface, etc.) for displaying social media posts and/or comments on a social media platform. In some examples, the first client device 500 is configured to display a debate platform application summary that can be reached directly from the menu, wherein the debate platform application summary displays a limited list of data offered within the one or more features. In some examples, each of the data in the limited list of data is selectable to launch the respective feature (of the one or more features) and enable the selected data to be seen within the respective feature. In some examples, the debate platform application summary is displayed while the one or more features are in an un-launched and/or unopened state.

In some examples, at least some of the disclosed subject matter may be implemented on a client device, and in some examples, at least some of the disclosed subject matter may be implemented on a server (e.g., hosting a service accessible via a network, such as the Internet).

Figure 6:
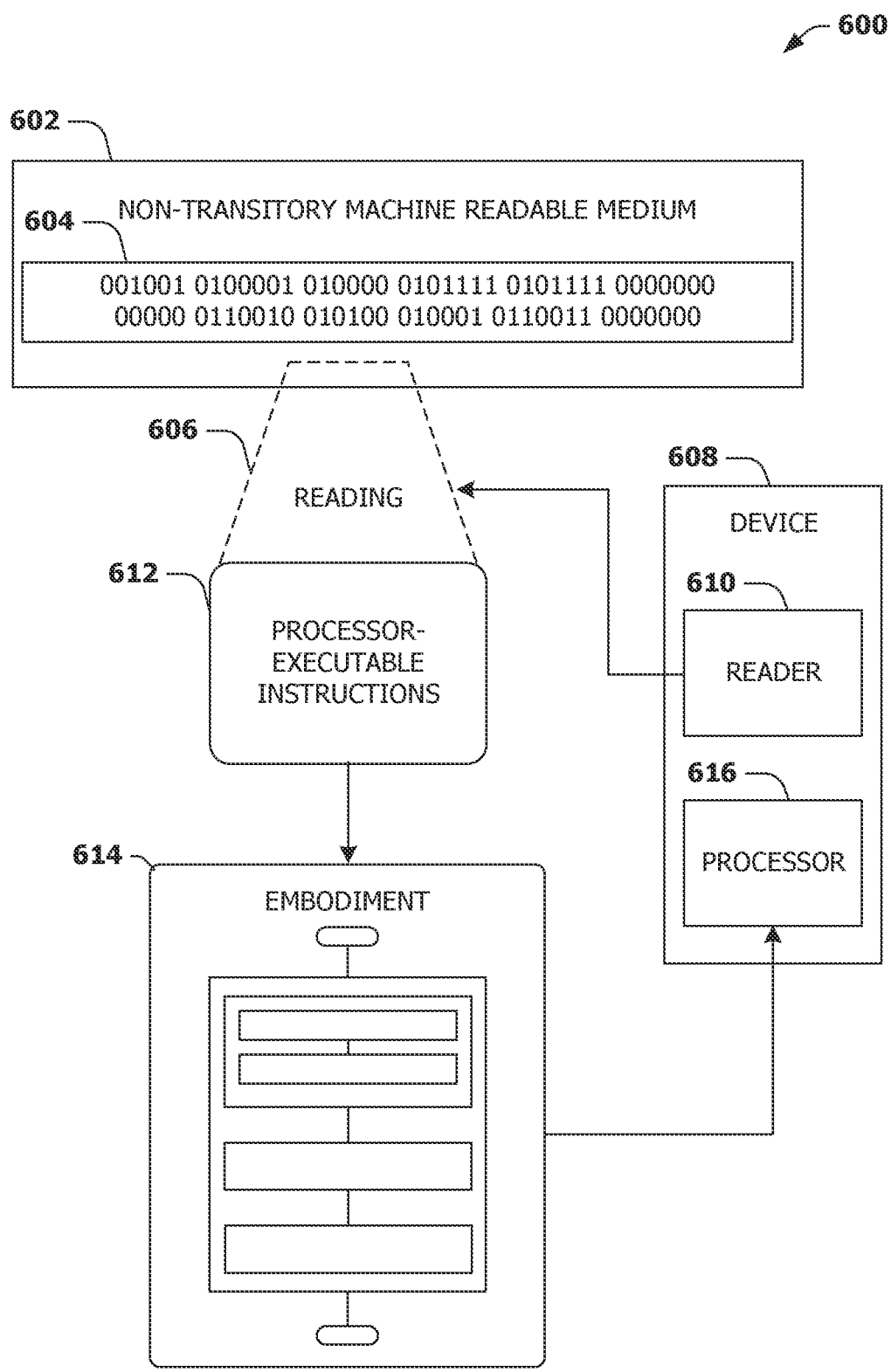
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIGS. 4A-4B, for example. In some embodiments, the processor-executable instructions 612 are configured to cause implementation of a system, such as at least some of the exemplary system 501 of FIGS. 5A-5M, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    displaying, via a first client device associated with a first user account of a debate system, a first debate interface;
    receiving, via the first debate interface, a starting argument post from the first client device;
    displaying, via a second client device associated with a second user account of the debate system, a second debate interface comprising a representation of the starting argument post;
    receiving, via the second debate interface, a first response post from the second client device, wherein:
        the first response post corresponds to a response to the starting argument post; and
        the starting argument post and the first response post are included in a first debate thread corresponding to a debate between the first user account and the second user account;

in response to determining that a first submission status of the first user account changed from inactive to active, transmitting an electronic notification from a server to the first client device associated with the first user account and enabling, via the first debate interface, submission of a response post for inclusion in the first debate thread, wherein the first submission status of the first user account is active after the first response post is received from the second client device;

receiving, via the first debate interface and when the first submission status of the first user account is active, a second response post from the first client device;

in response to receiving the second response post from the first client device, including the second response post in the first debate thread;

in response to determining that a second submission status of the second user account changed from inactive to active, transmitting a second electronic notification from the server to the second client device associated with the second user account and enabling, via the second debate interface, submission of a response post for inclusion in the first debate thread, wherein the second submission status of the second user account is active after the second response post is received from the first client device;

receiving, via the second debate interface and when the second submission status of the second user account is active, a third response post from the second client device;

in response to receiving the third response post from the second client device, including the third response post in the first debate thread;

receiving a request to quit the first debate thread from a client device associated with a user account, wherein the user account is the first user account or the second user account;

displaying, via the client device, a plurality of selectable inputs associated with a plurality of quitting statements, wherein the plurality of quitting statements comprises at least one of:
a first quitting statement that a user agrees that a point of view of an opponent is valid; or
a second quitting statement that a user agrees that the user lost the debate;

receiving a selection of a selectable input of the plurality of selectable inputs; and labeling the first debate thread as complete in response to a determination that a first condition is met based upon the selection of the selectable input.

2. The method of claim 1, comprising:
at a first time, setting the first submission status of the first user account to active based upon a determination that a most recent submission of a post for inclusion in the first debate thread is by the second user account; and
at a second time, setting the second submission status of the second user account to active based upon a determination that a most recent submission of a post for inclusion in the first debate thread is by the first user account.

3. The method of claim 2, wherein:
the first submission status of the first user account and the second submission status of the second user account are not set to active at the same time.

4. The method of claim 1, comprising:
prior to including the second response post in the first debate thread, displaying a first representation of the first debate thread via the first debate interface, wherein the first representation of the first debate thread comprises the starting argument post and the first response post; and
after including the third response post in the first debate thread, displaying a second representation of the first debate thread via the first debate interface, wherein the second representation of the first debate thread comprises the starting argument post, the first response post, the second response post and the third response post.

5. The method of claim 1, comprising:
in response to receiving the second response post from the first client device, analyzing the second response post to determine whether or not the second response post meets one or more second conditions, wherein the including the second response post in the first debate thread is performed based upon a determination that the second response post meets the one or more second conditions.

6. The method of claim 5, wherein the one or more second conditions comprise at least one of:
a condition that the second response post is coherent;
a condition that the second response post does not comprise violent language;
a condition that the second response post does not comprise threatening language;
a condition that the second response post does not comprise insults; or
a condition that the second response post does not comprise a link to an internet resource.

7. The method of claim 1, comprising:
receiving, via the first debate interface and when the first submission status of the first user account is active, a fourth response post from the first client device; and
in response to receiving the fourth response post from the first client device, analyzing the fourth response post to determine whether or not the fourth response post meets one or more second conditions, wherein:
it is determined that the fourth response post does not meet the one or more second conditions; and
the fourth response post is not included in the first debate thread based upon the determination that the fourth response post does not meet the one or more second conditions.

8. The method of claim 7, comprising:
in response to receiving the fourth response post from the first client device:
setting the first submission status of the first user account to inactive;
when the first submission status of the first user account is inactive, disabling, via the first debate interface, submission of a response post for inclusion in the first debate thread; and
setting the second submission status of the second user account to active.

9. The method of claim 1, comprising:
displaying, via a third client device associated with a third user account of the debate system, a third debate interface comprising a representation of the first debate thread, wherein the third debate interface does not allow submission of a response post for inclusion in the first debate thread.

10. The method of claim 1, comprising:
analyzing user activity associated with a plurality of debate threads to determine a plurality of scores associated with the plurality of debate threads, wherein the plurality of scores comprises:

a first score, associated with a second debate thread of the plurality of debate threads, based upon a first measure of user activity associated with the second debate thread; and a second score, associated with a third debate thread of the plurality of debate threads, based upon a second measure of user activity associated with the third debate thread;

selecting a subset of debate threads, of the plurality of debate threads, based upon the plurality of scores; and displaying a list of debate thread items via a third debate interface on a third client device, wherein each debate thread item of the list of debate thread items comprises a link to view a debate thread of the subset of debate threads.

11. The method of claim 1, comprising:

displaying, via a third client device associated with a third user account of the debate system, a third debate interface;

receiving, via the third debate interface, a search query;

generating a plurality of search results based upon the search query, wherein each search result of the plurality of search results comprises a link to view at least one of a debate thread or a post of a debate thread;

receiving a selection of a search result, of the plurality of search results, associated with a second debate thread; and in response to receiving the selection of the search result, displaying a representation of the second debate thread via the third debate interface.

12. The method of claim 11, comprising:

determining, based upon historical activity information associated with the third user account, a plurality of debate thread scores associated with a plurality of debate threads, wherein the historical activity information comprises at least one of:
 a set of historical search queries, comprising the search query, received from one or more client devices associated with the third user account;
 a set of historical debate threads, comprising the second debate thread, accessed by one or more client devices associated with the third user account; or
 a set of historical posts posted on one or more debate threads by one or more client devices associated with the third user account;

selecting a subset of debate threads, of a plurality of debate threads, based upon the plurality of debate thread scores; and displaying a list of debate thread items via the third debate interface on the third client device, wherein each debate thread item of the list of debate thread items comprises a link to view a debate thread of the subset of debate threads.

13. The method of claim 1, comprising:

based upon the selection of the selectable input, including first information in the first debate thread, wherein the first information comprises at least one of:
 an indication that the user account lost the debate; or
 an indication of a quitting statement associated with the selectable input.

14. The method of claim 1, comprising:

at a first time, setting a submission status of a user account to active, wherein the user account is the first user account or the second user account; and determining that the first debate thread is abandoned by the user account based upon a threshold duration of time having passed since the first time without a response post being included in the first debate thread, wherein the first condition for labeling the first debate thread as complete is determined to be met based upon the debate thread being abandoned by the user account.

15. The method of claim 14, comprising:

based upon the debate thread being abandoned by the user account, including first information in the first debate thread, wherein the first information comprises at least one of:
 an indication that the user account lost the debate; or
 an indication that the user account abandoned the debate.

16. A computing device, comprising:

a processor; and memory comprising processor-executable instructions that when executed by the processor cause performance of operations, the operations comprising:
 displaying, via a first client device associated with a first user account of a debate system, a first debate interface;
 receiving, via the first debate interface, a starting argument post from the first client device;
 displaying, via a second client device associated with a second user account of the debate system, a second debate interface comprising a representation of the starting argument post;
 receiving, via the second debate interface, a first response post from the second client device, wherein:
  the first response post corresponds to a response to the starting argument post; and
  the starting argument post and the first response post are included in a first debate thread corresponding to a debate between the first user account and the second user account;
 in response to determining that a first submission status of the first user account changed from inactive to active, transmitting an electronic notification from a server to the first client device associated with the first user account and enabling, via the first debate interface, submission of a response post for inclusion in the first debate thread, wherein the first submission status of the first user account is active after the first response post is received from the second client device;
 receiving, via the first debate interface and when the first submission status of the first user account is active, a second response post from the first client device;
 in response to receiving the second response post from the first client device, including the second response post in the first debate thread;
 in response to determining that a second submission status of the second user account changed from inactive to active, transmitting a second electronic notification from the server to the second client device associated with the second user account and enabling, via the second debate interface, submission of a response post for inclusion in the first debate thread, wherein the second submission status of the second user account is active after the second response post is received from the first client device;
 receiving, via the second debate interface and when the second submission status of the second user account is active, a third response post from the second client device; and in response to receiving the third response post from the second client device, including the third response post in the first debate thread;
displaying, via a third client device associated with a third user account of the debate system, a third debate interface;
receiving, via the third debate interface, a search query;
generating a plurality of search results based upon the search query, wherein each search result of the plurality of search results comprises a link to view at least one of a debate thread or a post of a debate thread;
receiving a selection of a search result, of the plurality of search results, associated with a second debate thread;
in response to receiving the selection of the search result, displaying a representation of the second debate thread via the third debate interface;
determining, based upon historical activity information associated with the third user account, a plurality of debate thread scores associated with a plurality of debate threads, wherein the historical activity information comprises at least one of:
a set of historical search queries, comprising the search query, received from one or more client devices associated with the third user account;
a set of historical debate threads, comprising the second debate thread, accessed by one or more client devices associated with the third user account; or
a set of historical posts posted on one or more debate threads by one or more client devices associated with the third user account;
selecting a subset of debate threads, of the plurality of debate threads, based upon the plurality of debate thread scores; and
displaying a list of debate thread items via the third debate interface on the third client device, wherein each debate thread item of the list of debate thread items comprises a link to view a debate thread of the subset of debate threads.

17. The computing device of claim 16, the operations comprising:
at a first time, setting the first submission status of the first user account to active based upon a determination that a most recent submission of a post for inclusion in the first debate thread is by the second user account; and
at a second time, setting the second submission status of the second user account to active based upon a determination that a most recent submission of a post for inclusion in the first debate thread is by the first user account, wherein the first submission status of the first user account and the second submission status of the second user account are not set to active at the same time.

18. The computing device of claim 16, the operations comprising:
prior to including the second response post in the first debate thread, displaying a first representation of the first debate thread via the first debate interface, wherein the first representation of the first debate thread comprises the starting argument post and the first response post; and
after including the third response post in the first debate thread, displaying a second representation of the first debate thread via the first debate interface, wherein the second representation of the first debate thread comprises the starting argument post, the first response post, the second response post and the third response post.

19. A non-transitory machine readable medium having stored thereon processor-executable instructions that when executed cause performance of operations, the operations comprising:
displaying, via a first client device associated with a first user account of a debate system, a first debate interface;
receiving, via the first debate interface, a starting argument post from the first client device;
displaying, via a second client device associated with a second user account of the debate system, a second debate interface comprising a representation of the starting argument post;
receiving, via the second debate interface, a first response post from the second client device, wherein:
the first response post corresponds to a response to the starting argument post; and
the starting argument post and the first response post are included in a first debate thread corresponding to a debate between the first user account and the second user account;
in response to determining that a first submission status of the first user account changed from inactive to active, transmitting an electronic notification from a server to the first client device associated with the first user account and enabling, via the first debate interface, submission of a response post for inclusion in the first debate thread, wherein the first submission status of the first user account is active after the first response post is received from the second client device;
receiving, via the first debate interface and when the first submission status of the first user account is active, a second response post from the first client device;
in response to receiving the second response post from the first client device, including the second response post in the first debate thread;
in response to determining that a second submission status of the second user account changed from inactive to active, transmitting a second electronic notification from the server to the second client device associated with the second user account and enabling, via the second debate interface, submission of a response post for inclusion in the first debate thread, wherein the second submission status of the second user account is active after the second response post is received from the first client device;
receiving, via the second debate interface and when the second submission status of the second user account is active, a third response post from the second client device; and
in response to receiving the third response post from the second client device, including the third response post in the first debate thread;
receiving a request to quit the first debate thread from a client device associated with a user account, wherein the user account is the first user account or the second user account;
displaying, via the client device, a plurality of selectable inputs associated with a plurality of quitting statements, wherein the plurality of quitting statements comprises at least one of:
a first quitting statement that a user agrees that a point of view of an opponent is valid; or
a second quitting statement that a user agrees that the user lost the debate;

receiving a selection of a selectable input of the plurality of selectable inputs; and labeling the first debate thread as complete in response to a determination that a first condition is met based upon the selection of the selectable input.

20. The non-transitory machine readable medium of claim 19, the operations comprising:

prior to including the second response post in the first debate thread, displaying a first representation of the first debate thread via the first debate interface, wherein the first representation of the first debate thread comprises the starting argument post and the first response post; and after including the third response post in the first debate thread, displaying a second representation of the first debate thread via the first debate interface, wherein the second representation of the first debate thread comprises the starting argument post, the first response post, the second response post and the third response post.

* * * * *